United States Patent
Manolakos et al.

(10) Patent No.: US 12,302,255 B2
(45) Date of Patent: May 13, 2025

(54) TRANSMIT POWER CONTROL FOR POSITIONING USING NON-SERVING CELLS

(71) Applicant: QUALCOMM Incorporated, San Diego, CA (US)

(72) Inventors: Alexandros Manolakos, Escondido, CA (US); Sony Akkarakaran, Poway, CA (US); Guttorm Ringstad Opshaug, Redwood City, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/462,215

(22) Filed: Sep. 6, 2023

(65) Prior Publication Data

US 2023/0422181 A1    Dec. 28, 2023

Related U.S. Application Data

(63) Continuation of application No. 17/586,419, filed on Jan. 27, 2022, now Pat. No. 11,785,553, which is a
(Continued)

(30) Foreign Application Priority Data

May 8, 2019    (GR) .............................. 20190100200

(51) Int. Cl.
*H04W 52/36*    (2009.01)
*H04L 5/00*    (2006.01)
(Continued)

(52) U.S. Cl.
CPC ......... *H04W 52/146* (2013.01); *H04L 5/0048* (2013.01); *H04W 4/025* (2013.01);
(Continued)

(58) Field of Classification Search
CPC ... H04W 76/27; H04W 16/28; H04W 72/231; H04W 72/232; H04W 76/15;
(Continued)

(56) References Cited

U.S. PATENT DOCUMENTS 9,402,193 B2    7/2016    Sampath et al.
10,219,259 B2    2/2019    Kubota et al.
(Continued)

FOREIGN PATENT DOCUMENTS

KR    20170114234 A    10/2017
WO    WO-2010108147 A1    9/2010
WO    WO-2017196940    11/2017

OTHER PUBLICATIONS

3GPP TS 38.213: "3rd Generation Partnership Project; Technical Specification Group Radio Access Network; NR; Physical Layer Procedures for Control (Release 15)", 3GPP Draft, 38213-F50, 3rd Generation Partnership Project (3GPP), Mobile Competence Centre, 650, Route Des Lucioles, F-06921 Sophia-Antipolis Cedex, France, vol. RAN WG1, No. V15.5.0 (Mar. 2019), Mar. 27, 2019 (Mar. 27, 2019), 104 Pages, XP051722950, XP051686992, p. 12-p. 74, section 7.3.1.
(Continued)

*Primary Examiner* — Tu X Nguyen
(74) *Attorney, Agent, or Firm* — Holland & Hart LLP/Qualcomm

(57) ABSTRACT

Methods, systems, and devices for transmit power control for positioning using non-serving cells are described. A user equipment (UE) may determine that an uplink reference signal may be associated with a positioning procedure. In some cases, the positioning procedure may include transmission, by the UE, of the reference signal to a non-serving cell, which may be farther away from the UE than a serving cell. The UE may determine an absence of a parameter associated with a transmit power for transmitting the refer-
(Continued)

ence signal. Based on the absence, the UE may determine the transmit power based on parameters received from a serving cell, based on configuration information, based on a message intercepted from the cell other than the serving cell, or based on other considerations or information.

24 Claims, 14 Drawing Sheets

Related U.S. Application Data continuation of application No. 16/831,707, filed on Mar. 26, 2020, now Pat. No. 11,452,046.

(51) Int. Cl.
*H04W 4/02* (2018.01)
*H04W 52/14* (2009.01)
*H04W 52/24* (2009.01)
*H04W 52/32* (2009.01)
*H04W 72/04* (2023.01)

(52) U.S. Cl.
CPC ....... *H04W 52/242* (2013.01); *H04W 52/325* (2013.01); *H04W 72/04* (2013.01)

(58) Field of Classification Search
CPC ..... H04W 76/10; H04W 52/10; H04W 52/36; H04W 88/08; H04W 72/20; H04W 52/08; H04W 92/20; H04W 52/06; H04W 52/60; H04W 40/20; H04W 72/1268
See application file for complete search history.

(56) References Cited

U.S. PATENT DOCUMENTS

| | | |
|---|---|---|
| 11,452,046 B2 | 9/2022 | Manolakos et al. |
| 2019/0053071 A1 | 2/2019 | Ly |
| 2020/0221405 A1 | 7/2020 | Zarifi |
| 2022/0150842 A1 | 5/2022 | Manolakos et al. |

OTHER PUBLICATIONS

Fraunhofer IIS., et al., "Details on Uplink PRS Signal Design", 3GPP Draft, 3GPP TSG RAN WG1 Meeting #97, R1-1907088 UL PRS Signal Design, 3rd Generation Partnership Project (3GPP), Mobile Competence Centre, 650, Route Des Lucioles, F-06921, Sophia-Antipolis Cedex, France, vol. RAN WG1, No. Reno, US; May 13, 2019-May 17, 2019, May 3, 2019 (May 3, 2019), XP051709117, 16 pages, section 2.1section 2.2.

Huawei: "DL and UL Reference Signals for NR Positioning", 3GPP Draft; 3GPP TSG RAN WG1 Meeting #96bis, R1-1904004, 3rd Generation Partnership Project (3GPP), Mobile Competence Centre; 650, Route Des Lucioles; F-06921 Sophia-Antipolis Cedex; France, vol. RAN WG1, No. Xi'an, China; Apr. 8, 2019-Apr. 12, 2019, Apr. 2, 2019 (Apr. 2, 2019), XP051707080, 13 Pages, The whole document, Section 1, paragraph [02.3] - paragraph [02.4], p. 3.

International Search Report and Written Opinion—PCT/US2020/025298—ISA/EPO—Jul. 9, 2020.

TRANSMIT POWER CONTROL FOR POSITIONING USING NON-SERVING CELLS

CROSS REFERENCE TO RELATED APPLICATIONS

The present application for patent is a Continuation of U.S. patent application Ser. No. 17/586,419 by MANALAKOS et al., entitled "TRANSMIT POWER CONTROL FOR POSITIONING USING NON-SERVING CELLS" and filed Jan. 27, 2022, which is a Continuation of U.S. patent application Ser. No. 16/831,707 by MANOLAKOS et al., entitled "TRANSMIT POWER CONTROL FOR POSITIONING USING NON-SERVING CELLS" and filed Mar. 26, 2020, which claims the benefit of Greek Provisional Patent Application No. 20190100200 by MANOLAKOS et al., entitled "TRANSMIT POWER CONTROL FOR POSITIONING USING NON-SERVING CELLS" and filed May 8, 2019, each of which is assigned to the assignee hereof and expressly incorporated herein.

BACKGROUND

The following relates generally to wireless communications, and more specifically to transmit power control for positioning using cells other than serving cells.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may transmit a reference signal to multiple base stations to enable a base station to determine the UE's position (e.g., geographic location) based on the reference signal. Conventional procedures for transmitting a reference signal for positioning may be deficient.

SUMMARY

The described techniques relate to improved methods, systems, devices, and apparatuses that support transmit power control for positioning using non-serving cells. Generally, the described techniques provide for determining a transmit power at which the UE may transmit a reference signal during a positioning procedure. A UE may perform a positioning procedure to enable a base station to identify the UE's position by transmitting (e.g., broadcasting, or separately transmitting) a reference signal to a serving cell (e.g., a base station that has established a connection with the UE using a connection procedure), to a non-serving cell (e.g., a base station for which no connection has been established with the UE), or to both types of cells. Non-serving cells are often farther away from the UE than serving cells, and thus it may be appropriate to transmit the reference signal to a non-serving cell using a higher transmit power than may be used to transmit the reference signal to a serving cell. In some cases, if the UE determines that a reference signal will be used for a positioning procedure that may include transmission of the reference signal to a non-serving cell, the UE may determine the transmit power based on one or more parameters received from the serving cell, based on a message intercepted from the non-serving cell, and/or based on configuration information stored at the UE.

A method of wireless communications at a UE is described. The method may include determining that a reference signal is associated with a positioning procedure to identify a geographic location of the UE, determining, based on determining that the reference signal is associated with the positioning procedure, an absence of a first parameter associated with a transmit power for transmitting the reference signal, determining, based on the absence of the first parameter, the transmit power, and transmitting, during the positioning procedure, the reference signal according to the transmit power.

An apparatus for wireless communications at a UE is described. The apparatus may include one or more transceivers; one or more memory; and one or more processors electronically coupled to the one or more memory and the one or more transceivers, the one or more processors configured to cause the apparatus to determine that a reference signal is associated with a positioning procedure to identify a geographic location of the UE, determine, based on determining that the reference signal is associated with the positioning procedure, an absence of a first parameter associated with a transmit power for transmitting the reference signal, determine, based on the absence of the first parameter, the transmit power, and transmit, via the one or more transceivers during the positioning procedure, the reference signal according to the transmit power.

Another apparatus for wireless communications at a UE is described. The apparatus may include means for determining that a reference signal is associated with a positioning procedure to identify a geographic location of the UE, determining, based on determining that the reference signal is associated with the positioning procedure, an absence of a first parameter associated with a transmit power for transmitting the reference signal, determining, based on the absence of the first parameter, the transmit power, and transmitting, during the positioning procedure, the reference signal according to the transmit power.

A non-transitory computer-readable medium storing code for wireless communications at a UE is described. The code may include instructions executable by a processor to determine that a reference signal is associated with a positioning procedure to identify a geographic location of the UE, determine, based on determining that the reference signal is associated with the positioning procedure, an absence of a first parameter associated with a transmit power for transmitting the reference signal, determine, based on the absence of the first parameter, the transmit power, and transmit, during the positioning procedure, the reference signal according to the transmit power.

Some examples of the method, apparatuses, and non-transitory computer-readable medium described herein may further include operations, features, means, or instructions for establishing a connection with a serving cell, and receiving, from the serving cell, an indication of the transmit power, where the transmit power may be associated with a non-serving cell, and where determining the transmit power includes receiving the indication of the transmit power.

In some examples of the method, apparatuses, and non-transitory computer-readable medium described herein, the indication of the transmit power includes a value of the transmit power, and operations, features, means, or instructions for determining the transmit power may include operations, features, means, or instructions for setting the transmit power to the transmit power.

In some examples of the method, apparatuses, and non-transitory computer-readable medium described herein, the first parameter corresponds to a target received power at the non-serving cell, the indication of the transmit power includes a first value of the first parameter, and operations, features, means, or instructions for determining the transmit power may include operations, features, means, or instructions for calculating the transmit power based on the first value.

In some examples of the method, apparatuses, and non-transitory computer-readable medium described herein, the first parameter corresponds to a reference path loss associated with a signal degradation between the UE and the non-serving cell, and operations, features, means, or instructions for determining the absence of the first parameter may include operations, features, means, or instructions for determining the absence of a downlink reference signal for estimating a path loss between the UE and the non-serving cell.

In some examples of the method, apparatuses, and non-transitory computer-readable medium described herein, operations, features, means, or instructions for transmitting the reference signal according to the transmit power may include operations, features, means, or instructions for transmitting the reference signal to the non-serving cell with the transmit power.

In some examples of the method, apparatuses, and non-transitory computer-readable medium described herein, the serving cell may be a first base station and the non-serving cell may be a second base station.

In some examples of the method, apparatuses, and non-transitory computer-readable medium described herein, operations, features, means, or instructions for determining the transmit power may include operations, features, means, or instructions for determining a maximum transmit power associated with the UE and setting the transmit power to the maximum transmit power.

In some examples of the method, apparatuses, and non-transitory computer-readable medium described herein, operations, features, means, or instructions for determining the transmit power may include operations, features, means, or instructions for identifying a maximum target received power at a serving cell and calculating the transmit power based on the maximum target received power.

Some examples of the method, apparatuses, and non-transitory computer-readable medium described herein may further include operations, features, means, or instructions for establishing a connection with a serving cell, receiving a message from a non-serving cell, and determining a first value of the first parameter based on the message, where determining the transmit power includes calculating the transmit power based at least in part on the first value of the first parameter.

In some examples of the method, apparatuses, and non-transitory computer-readable medium described herein, the message may be received in a master information block from the non-serving cell.

Some examples of the method, apparatuses, and non-transitory computer-readable medium described herein may further include operations, features, means, or instructions for determining a target received power associated with an uplink shared channel transmission to a serving cell, and increasing the target received power by an offset amount, where operations, features, means, or instructions for determining the transmit power may include operations, features, means, or instructions for calculating the transmit power based on the increased target received power.

In some examples of the method, apparatuses, and non-transitory computer-readable medium described herein, operations, features, means, or instructions for determining that the reference signal may be associated with the positioning procedure may include operations, features, means, or instructions for receiving an explicit indication that the reference signal may be associated with the positioning procedure.

In some examples of the method, apparatuses, and non-transitory computer-readable medium described herein, operations, features, means, or instructions for determining that the reference signal may be associated with the positioning procedure may include operations, features, means, or instructions for receiving a positioning report configuration associated with the reference signal.

In some examples of the method, apparatuses, and non-transitory computer-readable medium described herein, operations, features, means, or instructions for determining that the reference signal may be associated with the positioning procedure may include operations, features, means, or instructions for receiving an indication that the reference signal may be an uplink reference signal associated with a downlink positioning reference signal (PRS).

In some examples of the method, apparatuses, and non-transitory computer-readable medium described herein, the reference signal may be a sounding reference signal (SRS) associated with supporting communications between the UE and a base station based at least in part on supporting one of code-book based uplink communications, non-codebook-based uplink communications, antenna switching, uplink beam management, or any combination thereof.

Some examples of the method, apparatuses, and non-transitory computer-readable medium described herein may further include operations, features, means, or instructions for determining that the reference signal is not for supporting communications between the UE and the base station, where determining the transmit power may be based on determining that the reference signal is not for supporting communications.

Some examples of the method, apparatuses, and non-transitory computer-readable medium described herein may further include operations, features, means, or instructions for determining an absence of information regarding whether the positioning procedure includes transmission of the reference signal to a serving cell, to a non-serving cell, or to both the serving cell and the non-serving cell, where determining the transmit power may be based on determining the absence of information.

Some examples of the method, apparatuses, and non-transitory computer-readable medium described herein may further include operations, features, means, or instructions for determining that the positioning procedure includes transmission of the reference signal to a non-serving cell, where determining the transmit power may be based on determining that the positioning procedure includes transmission of the reference signal to the non-serving cell.

In some examples of the method, apparatuses, and non-transitory computer-readable medium described herein, operations, features, means, or instructions for determining that the positioning procedure comprises transmission of the reference signal to the non-serving cell may include operations, features, means, or instructions for receiving, from a serving cell, a cell identifier associated with the non-serving cell.

In some examples of the method, apparatuses, and non-transitory computer-readable medium described herein, operations, features, means, or instructions for determining that the positioning procedure may include operations, features, means, or instructions for receiving, from a serving cell, a sequence identifier associated with the non-serving cell.

In some examples of the method, apparatuses, and non-transitory computer-readable medium described herein, operations, features, means, or instructions for determining that the positioning procedure may include operations, features, means, or instructions for determining spatial relationship information associated with a second reference signal received from the non-serving cell.

In some examples of the method, apparatuses, and non-transitory computer-readable medium described herein, the spatial relationship information includes a direction of a transmit beam towards the non-serving cell.

Some examples of the method, apparatuses, and non-transitory computer-readable medium described herein may further include operations, features, means, or instructions for receiving configuration information indicating a method for determining the transmit power, where determining the transmit power may be based on the configuration information.

Some examples of the method, apparatuses, and non-transitory computer-readable medium described herein may further include operations, features, means, or instructions for determining a power capability of the UE, where determining the transmit power may be based on the power capability of the UE.

Some examples of the method, apparatuses, and non-transitory computer-readable medium described herein may further include operations, features, means, or instructions for transmitting, to a serving cell, an indication of the absence of the first parameter, and receiving, from the serving cell, an indication of a first value of the transmit power, where determining the transmit power may be based on the first value of the transmit power.

A method of wireless communications at a network entity is described. The method may include transmitting, to a UE or to a serving cell of the UE, an indication that a reference signal is associated with a positioning procedure to identify a geographic location of the UE, the positioning procedure including a transmission of the reference signal from the UE to a non-serving cell, determining a distance of the non-serving cell from the UE, determining, based on the distance of the non-serving cell from the UE, a parameter associated with a transmit power for the transmission of the reference signal from the UE to the non-serving cell during the positioning procedure, and transmitting the parameter to the UE or to the serving cell of the UE.

An apparatus for wireless communications at a network entity is described. The apparatus may include one or more transceivers; one or more memory; and one or more processors electronically coupled to the one or more memory and the one or more transceivers, the one or more processors configured to cause the apparatus to transmit, to a UE or to a serving cell of the UE, an indication that a reference signal is associated with a positioning procedure to identify a geographic location of the UE, the positioning procedure including a transmission of the reference signal from the UE to a non-serving cell, determine a distance of the non-serving cell from the UE, determine, based on the distance of the non-serving cell from the UE, a parameter associated with a transmit power for the transmission of the reference signal from the UE to the non-serving cell during the positioning procedure, and transmit the parameter to the UE or to the serving cell of the UE.

Another apparatus for wireless communications at a network entity is described. The apparatus may include means for transmitting, to a UE or to a serving cell of the UE, an indication that a reference signal is associated with a positioning procedure to identify a geographic location of the UE, the positioning procedure including a transmission of the reference signal from the UE to a non-serving cell, determining a distance of the non-serving cell from the UE, determining, based on the distance of the non-serving cell from the UE, a parameter associated with a transmit power for the transmission of the reference signal from the UE to the non-serving cell during the positioning procedure, and transmitting the parameter to the UE or to the serving cell of the UE.

A non-transitory computer-readable medium storing code for wireless communications at a network entity is described. The code may include instructions executable by a processor to transmit, to a UE or to a serving cell of the UE, an indication that a reference signal is associated with a positioning procedure to identify a geographic location of the UE, the positioning procedure including a transmission of the reference signal from the UE to a non-serving cell, determine a distance of the non-serving cell from the UE, determine, based on the distance of the non-serving cell from the UE, a parameter associated with a transmit power for the transmission of the reference signal from the UE to the non-serving cell during the positioning procedure, and transmit the parameter to the UE or to the serving cell of the UE.

Some examples of the method, apparatuses, and non-transitory computer-readable medium described herein may further include operations, features, means, or instructions for initiating establishment of a connection between the UE and the serving cell for the UE.

In some examples of the method, apparatuses, and non-transitory computer-readable medium described herein, the network entity is a base station that provides the serving cell for the UE, or the network entity is a location server.

In some examples of the method, apparatuses, and non-transitory computer-readable medium described herein, the parameter is the transmit power.

In some examples of the method, apparatuses, and non-transitory computer-readable medium described herein, the parameter is a target received power at the non-serving cell.

In some examples of the method, apparatuses, and non-transitory computer-readable medium described herein, the operations, features, means, or instructions for positioning procedure further may include operations, features, means, or instructions for determining a second parameter associated with a second transmit power for the transmission of the reference signal to the base station during the positioning procedure, and for transmitting the second parameter to the UE.

In some examples of the method, apparatuses, and non-transitory computer-readable medium described herein, operations, features, means, or instructions for transmitting the indication that the reference signal may be associated with the positioning procedure may include operations, features, means, or instructions for transmitting, to the UE or to the serving cell of the UE, an explicit indication that the reference signal may be associated with the positioning procedure.

In some examples of the method, apparatuses, and non-transitory computer-readable medium described herein, operations, features, means, or instructions for transmitting the indication that the reference signal may be associated with the positioning procedure may include operations, features, means, or instructions for transmitting, to the UE or to the serving cell of the UE, an indication that a downlink PRS may be associated with the reference signal.

In some examples of the method, apparatuses, and non-transitory computer-readable medium described herein, operations, features, means, or instructions for transmitting the indication that the reference signal may be associated with the positioning procedure may include operations, features, means, or instructions for transmitting, to the UE or to the serving cell of the UE, a request for a positioning report associated with the reference signal.

Some examples of the method, apparatuses, and non-transitory computer-readable medium described herein may further include operations, features, means, or instructions for transmitting, to the UE or to the serving cell of the UE, an indication that the positioning procedure includes transmission of the reference signal by the UE to the non-serving cell.

In some examples of the method, apparatuses, and non-transitory computer-readable medium described herein, operations, features, means, or instructions for transmitting the indication that the positioning procedure includes the transmission of the reference signal by the UE to the non-serving cell may include operations, features, means, or instructions for transmitting, to the UE or to the serving cell of the UE, a cell identifier associated with the non-serving cell.

In some examples of the method, apparatuses, and non-transitory computer-readable medium described herein, operations, features, means, or instructions for transmitting the indication that the positioning procedure includes the transmission of the reference signal by the UE to the non-serving cell may include operations, features, means, or instructions for transmitting, to the UE or to the serving cell of the UE, a sequence identifier associated with the non-serving cell.

In some examples of the method, apparatuses, and non-transitory computer-readable medium described herein, the second parameter may be different than the parameter.

In some examples of the method, apparatuses, and non-transitory computer-readable medium described herein, the reference signal may be an SRS associated with supporting communications between the UE and the network entity based at least in part on supporting code-book based uplink communications, non-codebook-based uplink communications, antenna switching, uplink beam management, or any combination thereof.

Some examples of the method, apparatuses, and non-transitory computer-readable medium described herein may further include operations, features, means, or instructions for transmitting, to the UE or to the serving cell of the UE, an indication that the reference signal may be used for supporting communications between the UE and the network entity.

Some examples of the method, apparatuses, and non-transitory computer-readable medium described herein may further include operations, features, means, or instructions for receiving the reference signal from the UE, and estimating, based on the reference signal, a time delay associated with receiving the receiving the reference signal, where the time delay may be associated with estimating a geographic location of the UE.

Some examples of the method, apparatuses, and non-transitory computer-readable medium described herein may further include operations, features, means, or instructions for transmitting, to the UE or to the serving cell of the UE, configuration information indicating a method for determining the transmit power.

Some examples of the method, apparatuses, and non-transitory computer-readable medium described herein may further include operations, features, means, or instructions for receiving, from the UE, an indication of an absence of a first parameter associated with a transmit power for the transmission of the reference signal from the UE to the non-serving cell, and transmitting, to the UE or to the serving cell of the UE, an indication of a first value of the transmit power.

A method of wireless communications at a UE is described. The method may include determining that a reference signal is associated with a positioning procedure to identify a geographic location of the UE, determining, based on determining that the reference signal is associated with the positioning procedure, an absence of a first parameter associated with a transmit power for transmitting the reference signal, and refraining, based on determining the absence of the first parameter, from transmitting the reference signal.

An apparatus for wireless communications at a UE is described. The apparatus may include one or more transceivers; one or more memory; and one or more processors electronically coupled to the one or more memory and the one or more transceivers, the one or more processors configured to cause the apparatus to determine that a reference signal is associated with a positioning procedure to identify a geographic location of the UE, determine, based on determining that the reference signal is associated with the positioning procedure, an absence of a first parameter associated with a transmit power for transmitting the reference signal, and refrain, based on determining the absence of the first parameter, from transmitting the reference signal.

Another apparatus for wireless communications at a UE is described. The apparatus may include means for determining that a reference signal is associated with a positioning procedure to identify a geographic location of the UE, determining, based on determining that the reference signal is associated with the positioning procedure, an absence of a first parameter associated with a transmit power for transmitting the reference signal, and refraining, based on determining the absence of the first parameter, from transmitting the reference signal.

A non-transitory computer-readable medium storing code for wireless communications at a UE is described. The code may include instructions executable by a processor to determine that a reference signal is associated with a positioning procedure to identify a geographic location of the UE, determine, based on determining that the reference signal is associated with the positioning procedure, an absence of a first parameter associated with a transmit power for transmitting the reference signal, and refrain, based on determining the absence of the first parameter, from transmitting the reference signal.

Some examples of the method, apparatuses, and non-transitory computer-readable medium described herein may further include operations, features, means, or instructions for transmitting, to a serving cell, an error message indicating the absence of the first parameter.

In some examples of the method, apparatuses, and non-transitory computer-readable medium described herein, the first parameter may be associated with a target receive power.

In some examples of the method, apparatuses, and non-transitory computer-readable medium described herein, the first parameter may be associated with an estimated path loss, and operations, features, means, or instructions for determining the absence of the first parameter may include operations, features, means, or instructions for determining an absence of a downlink reference signal for estimating a path loss.

DETAILED DESCRIPTION

Figure 1:
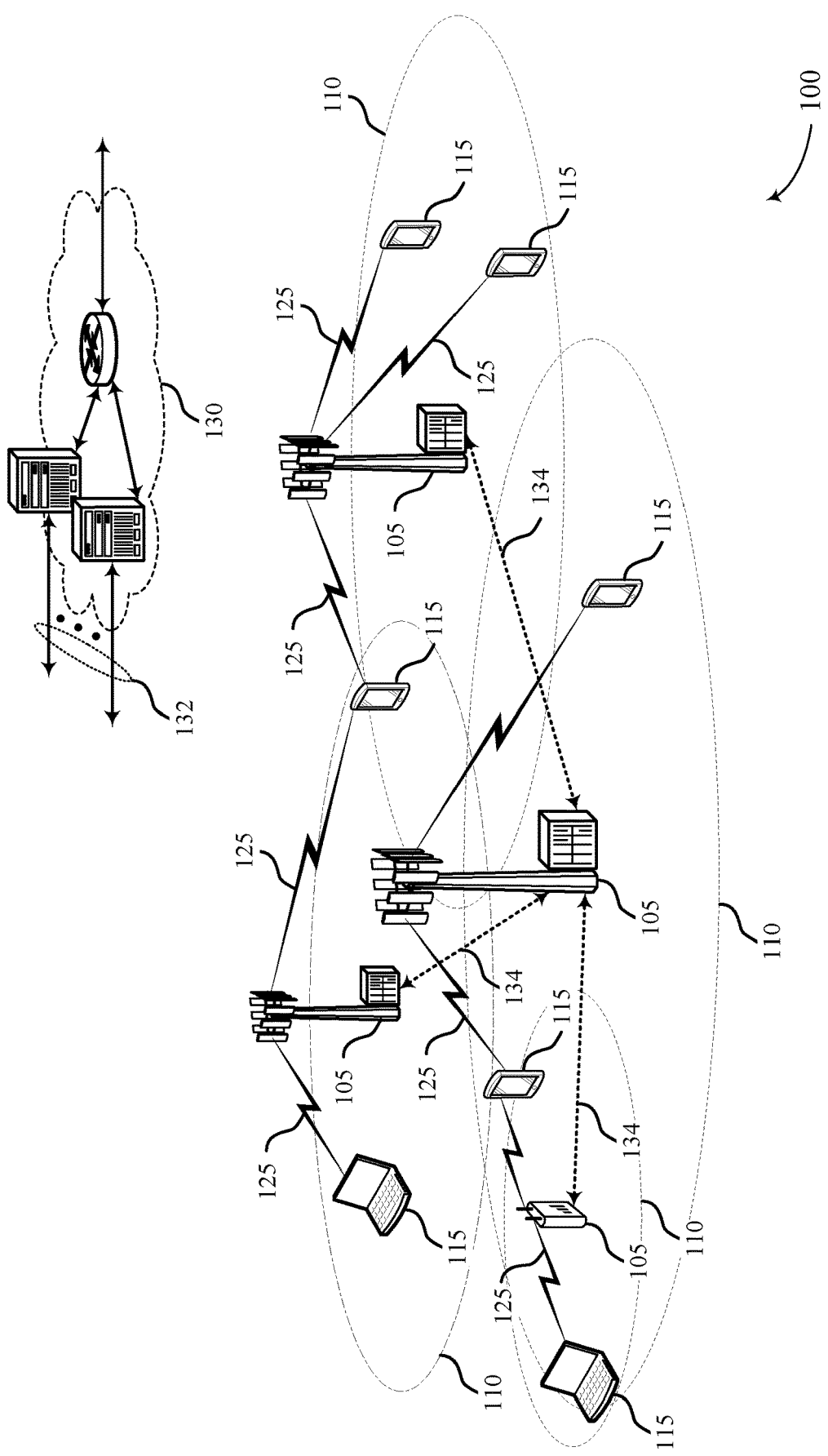
FIG. 1 illustrates an example of a system for wireless communications that supports transmit power control for positioning using non-serving cells in accordance with aspects of the present disclosure.

In some cases, a UE may transmit uplink reference signals, such as a sounding reference signal (SRS) or other reference signal, to a serving cell. Such uplink reference signals may be used by the serving cell for various purposes, such as for supporting communications between the UE and the serving cell. In such cases, a UE may transmit the reference signal to the serving cell at a transmit power that may be determined based on various parameters associated with the serving cell. An example parameter may be an estimated path loss (e.g., signal degradation) that may occur between the UE and the serving cell, which may be determined by the UE based on a downlink path loss reference signal. Another example parameter may be a target received power at the serving cell (e.g., a target power at which the reference signal may be received by the serving cell).

In some cases, uplink reference signals may be used for multi-lateral positioning of the UE. That is, a UE may transmit (e.g., broadcast, or separately transmit) an uplink reference signal to multiple base stations to enable a base station (e.g., the serving cell) to estimate the geographic location of the UE based on differences in the time of arrival of the reference signal at the multiple base stations.

In some cases, the base stations used for the positioning procedure may include non-serving cells; e.g., neighboring base stations with which the UE has not established a connection. In this case, determining the transmit power for the reference signal based on parameters associated with the serving cell may result in the use of a transmit power that is too low, since non-serving cells are typically farther away from the UE than serving cells. If the transmit power is too low, the non-serving cell may not receive the reference signal at a power level (e.g., a received power) that is sufficient for the non-serving cell to accurately decode the reference signal—or the non-serving cell may not detect the reference signal at all. Thus, transmitting the reference signal at a transmit power that is too low may lead to inaccurate or failed positioning of the UE.

To increase the likelihood that the reference signal will be received by the non-serving cell at an appropriate power level, in some cases, if a UE determines that an uplink reference signal is to be used for a positioning procedure (e.g., that may include transmitting the reference signal to a non-serving cell), and the UE determines an absence of a parameter associated with the transmit power (e.g., the UE has not received a parameter that may be used to calculate the transmit power or has not received a downlink reference signal for use in estimating a path loss parameter that may be used to calculate the transmit power), the UE may determine an appropriate transmit power for transmitting the reference signal to the non-serving cell, using parameters or information that may be different than those used to determine the transmit power for the serving cell. In this manner, a UE may enable better (e.g., more accurate) positioning procedures, by increasing the likelihood that the reference signal is received by the non-serving cells.

In some cases, the serving cell may identify the location of a non-serving cell and transmit one or more parameters to the UE that are based on the location of the non-serving cell, thereby providing information that the UE may use to determine an appropriate transmit power. In some cases, the serving cell may transmit a value of the transmit power that the UE may use to transmit the reference signal to the non-serving cell.

The UE may determine the transmit power based using a variety of techniques. For example, the UE may determine the transmit power based on parameters received from the serving cell. The UE may determine the transmit power based on a message transmitted by the non-serving cell and intercepted or otherwise received by the UE (such as a message that is broadcast by the non-serving cell in a master information block (MIB)). The UE may determine the transmit power by using the maximum transmit power supported by the UE or may calculate the transmit power using the maximum value of a parameter that indicates the target receive power. In some cases, a serving cell may configure the UE to select one or more of these techniques for determining the transmit power based on a capability of the UE and/or based on other factors. In some cases, if the reference signal is used for legacy purposes, such as for supporting communications between the UE and the serving cell, the UE may determine the transmit power using default techniques to maintain backwards compatibility and may refrain from determining the transmit power using the techniques described herein.

Aspects of the disclosure introduced above are described below in the context of a wireless communications system. Examples of signaling and processes that may support transmit power control for positioning using non-serving cells are then described. Aspects of the disclosure are further illustrated by and described with reference to apparatus diagrams, system diagrams, and flowcharts that relate to transmit power control for positioning using non-serving cells.

FIG. 1 illustrates an example of a wireless communications system 100 that supports transmit power control for positioning using non-serving cells in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). A network entity may be a base station, a server, a location server, or the like. The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels. In some cases, a base station 105 that has established an RRC connection with a UE (e.g., including communication of RRC connection messages and configuration information) may be referred to as a serving cell, and a base station 105 that has not established an RRC connection with a UE may be referred to as a non-serving cell or neighbor cell. In some cases, a UE may establish an RRC connection with a single serving cell or may establish RRC connections with multiple serving cells.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In wireless communications system 100 (e.g., which may be an example of a low frequency FR1 system or a high frequency FR2 system), a wireless device such as UE 115 may be configured to transmit a reference signal to one or more base stations 105, such as to one or more serving cells and/or non-serving cells, to enable a base station 105 to identify the UE's position. In some cases, a UE 115 may determine a transmit power at which to transmit the reference signal used for positioning.

Figure 2:
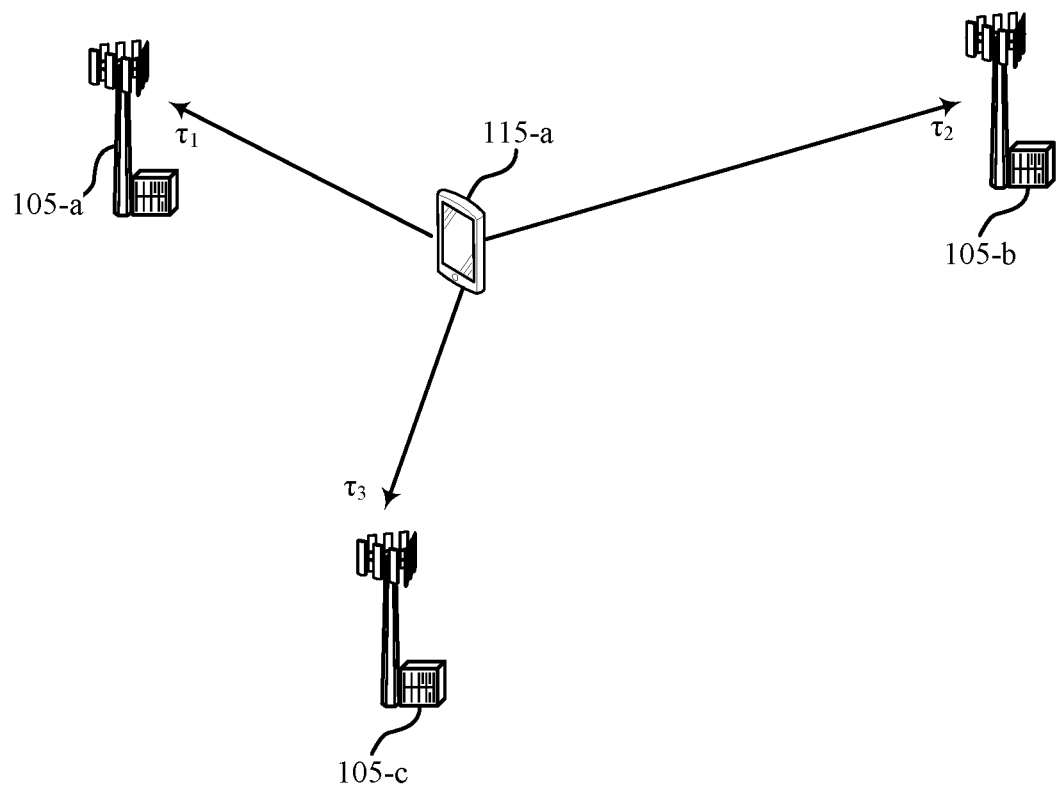
FIG. 2 illustrates an example of multi-lateral positioning based on reference signals in accordance with aspects of the present disclosure.

FIG. 2 illustrates an example of multi-lateral positioning 200 based on uplink reference signals in accordance with aspects of the present disclosure. In the example of FIG. 2, a UE 115-$a$ may transmit a reference signal, such as an SRS or other uplink reference signal, to multiple base stations 105 to enable multi-lateral positioning of UE 115-$a$. Such base stations 105 may include serving cells and/or non-serving cells. For example, base station 105-$a$ may be a serving cell for UE 115-$a$, and base stations 105-$b$ and 105-$c$ may be non-serving cells for UE 115-$a$. In some cases, one or more base stations 105, such as a serving cell 105-$a$, may perform multi-lateral positioning to identify the position of UE 115-$a$ based on the time delay of the uplink reference signal as received at multiple base stations 105. Each base station 105 may receive the (same) reference signal from the UE 115-$a$ with a different time delay, $\tau$, and each base station 105 may estimate the respective time delay $\tau$ associated with receiving the reference signal at that base station 105. In some cases, a base station 105 may estimate a geographic location of UE 115-$a$ based on the estimated time delay $\tau$. In some cases a base station 105 may communicate the estimated time delay $\tau$ to one or more other base stations 105, such as to a serving cell 105-$a$, to enable a base station 105 to determine the location of the UE 115-$a$ using a multi-lateral positioning approach. That is, the position of UE 115-$a$ may be determined, by one or more of the base stations 105 (e.g., by serving cell 105-$a$), based on the difference in the time delays (e.g., based on the differences between $\tau 1$, $\tau 2$, $\tau 3$), such as by using an uplink time difference of arrival (UTDOA) procedure. In some cases, base stations 105 may transmit respective indications of the time delays to UE 115-$a$, and UE 115-$a$ may determine its own position based on the differences between the time delays. In other examples, a location server may determine the geographic location of UE 115-$a$ and send it to one or more base stations 105. In general, functions ascribed herein to a serving cell 105 may alternatively be performed by a location server or other network entity in communication with the serving cell 105, with the serving cell 105 acting as a relay between the network entity and the UE 115.

Figure 3:
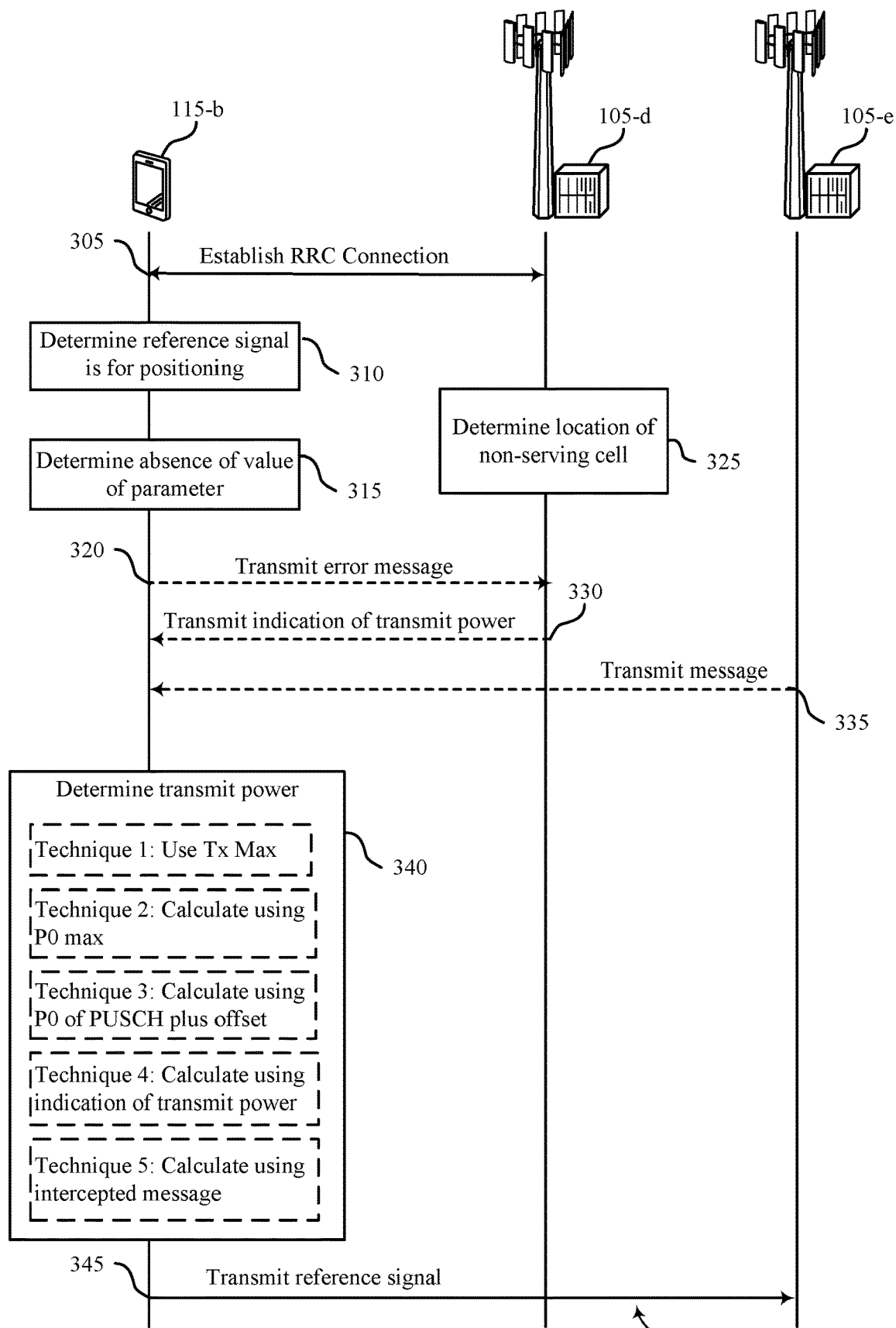
FIG. 3 illustrates an example of a process that supports transmit power control for positioning using non-serving cells in accordance with aspects of the present disclosure.

In some cases, if a UE 115-$a$ determines that an uplink reference signal is associated with a positioning procedure (e.g., the reference signal may be used for multi-lateral positioning 200) that may include transmitting the reference signal to a non-serving cell (e.g., to base station 105-$b$ and/or base station 105-$c$) and the UE 115-$a$ determines an absence of a parameter that may be associated with calculating a transmit power for the reference signal, the UE 115-$a$ may determine the transmit power as described in more detail with reference to FIG. 3.

FIG. 3 illustrates an example of a process 300 that supports transmit power control for positioning using non-serving cells in accordance with aspects of the present disclosure. In some examples, process 300 may implement aspects of wireless communication system 100 for performing multi-lateral positioning 200. Process 300 depicts signaling and operations that may be performed by a UE 115-$b$, one or more serving cells 105-$d$, and/or one or more non-serving cells 105-$e$. In some cases, the order of signaling or operations may differ from that shown in FIG. 3, and/or some of the signaling or operations may be omitted.

At 305, UE 115-$a$ may establish an RRC connection with serving cell 105-$d$. Establishing the RRC connection may include, for example, exchanging RRC signaling that may include configuration information to enable the UE 115-$a$ and the serving cell 105-$d$ to communicate over a channel. In some cases, UE 115-$a$ may refrain from establishing an RRC connection with non-serving cell 105-$e$ (e.g., UE 115-$a$ may be unconnected from non-serving cell 105-$e$), which may be a neighboring cell.

At 310, UE 115-$a$ may determine that a reference signal is associated with a positioning procedure. The reference signal may be an uplink reference signal (e.g., a signal to be transmitted by UE 115-$a$), such as an SRS or another reference signal.

In some cases, the reference signal may be associated with the positioning procedure if the reference signal will be used to determine a position (e.g., a geographic location) of UE 115-$a$, such as by being transmitted, by UE 115-$b$, to multiple base stations 105 for use in a multi-lateral positioning procedure 200 such as a UTDOA positioning procedure or another positioning procedure.

In some case, UE 115-$b$ may determine that the reference signal is associated with the positioning procedure based on an explicit indication that the reference signal will be used for the positioning procedure, which may be received from the serving cell 105-d, such as in configuration information that may be transmitted by serving cell 105-d to UE 115-b.

In some cases, UE 115-b may determine that the reference signal is associated with the positioning procedure based on an implicit indication received from the serving cell 105-d. For example, serving cell 105-d may transmit a positioning report configuration to UE 115-b that associates the reference signal with the positioning report, thereby implicitly indicating that the reference signal will be used in the positioning procedure. For example, serving cell 105-d may transmit configuration information to UE 115-a that associates the reference signal with a downlink positioning reference signal (PRS) that may be associated with determining, by the UE 115-b, the position of the UE 115-b.

In some cases, the reference signal may be used for other purposes, such as legacy purposes associated with older features, in addition to or instead of being used for positioning. For example, such legacy purposes may include using a reference signal to support communications between a UE 115-b and a base station 105, among other purposes. For example, if the reference signal is an SRS, the SRS may be used to support communications between the UE 115-a and the serving cell 105-d via supporting one or more of: codebook-based uplink communications, non-codebook-based uplink communications, uplink beam management, antenna switching, SRS for Cross Link Interference (CLI), and evaluation of channel quality. Thus, in some cases, a reference signal such as an SRS may be used for supporting communications in addition to or instead of being used for (e.g., associated with) a positioning procedure.

Based on determining that the reference signal is associated with a positioning procedure, the UE 115-b may determine whether the UE 115-b has access to (or can calculate) one or more parameters that may be used to determine the transmit power for transmitting the reference signal.

For example, in some cases, a UE 115-b may calculate a transmit power $P_{RS}$ (e.g., in decibel-milliwatts, dBm) for transmitting the reference signal based on Equation 1, below. Equation 1 may be an example of an equation that may enable a UE 115-b to determine a transmit power for a reference signal ($P_{RS}$) based on a target receive power (e.g., the target power of the reference signal as received at a target base station 105, which may be a serving cell or a non-serving cell) while compensating for various factors, such as path loss, that may reduce the power of the signal as it travels between the UE 115-d and the base station 105:

$$P_{RSb,f,c}(i, q_s, l) = \min \left\{ \begin{array}{l} P_{CMAXf,c}(i), \\ P_{O\_RSb,f,c}(q_s) + 10\log_{10}(2^\mu \cdot M_{RSb,f,c}(i)) + \\ \alpha_{RSb,f,c}(q_s) \cdot PL_{b,f,c}(q_d) + h_{b,f,c}(i, l) \end{array} \right\} [dBm]$$

where:
$P_{CMAXf,c}$ is a parameter indicating a maximum transmit power configured for the UE 115-a for a carrier f of a cell c (e.g., a serving cell, a non-serving cell) in a reference signal transmission occasion.

$P_{O\_RSb,f,c}(q_s)$ is a parameter indicating a target receive power at a cell c and resource set $q_s$ for an active uplink bandwidth part b of carrier f. In some cases, $P_0$ may be selected from a set of values of $P_0$, such as values ranging from −202 through 24 in increments of 2. In some cases, a set of values of P0 associated with a serving cell may be different than a set of values P0 associated with a non-serving cell.

$M_{RSb,f,c}$ is a reference signal bandwidth expressed in the number of resource blocks for a reference signal transmission occasion i on an active uplink bandwidth part b of carrier f of a cell c.

μ is a sub-carrier spacing configuration.

$P_{Lb,f,c}(q_d)$ is a downlink path loss estimate in decibels (dB) calculated by UE 115-b using a reference signal resource index $q_d$ for the active downlink bandwidth part of a cell c and reference signal resource set $q_s$. In some cases, UE 115-b may estimate the path loss value associated with transmissions to the serving cell 105-d based on a downlink path loss reference signal received from the serving cell 105-d, for example. In some cases, UE 115-b may estimate the path loss value associated with transmissions to the non-serving cell 105-e based on a message received from the non-serving cell 105-e, for example α is a scaling factor for the downlink path loss estimate, which may, for example, be signaled via higher-layer signaling (e.g., SIB2, RRC); and h is a closed-loop parameter (e.g., a parameter configured to provide closed-loop control as the equation is implemented).

Equation 1 or another equation (e.g., based on the same or different parameters, or any combination thereof) may be used, by a UE 115-a, to determine or calculate a transmit power that may be appropriate for transmitting a reference signal to a base station 105 based on, for example, a value of a target receive power $P_0$ at the base station 105 and/or based on a value of an estimated path loss PL along the communication path to the base station 105.

In some cases, at 315, UE 115-b may determine an absence of (e.g., a lack of, that the UE 115-b is missing) a parameter (e.g., a value of the parameter) associated with determining the transmit power using Equation 1, such as an absence of a value of the $P_0$ parameter specifying a target receive power or an absence of a value of the estimated path loss parameter $P_L$. For example, in some cases, a UE 115-b may not be provided with a downlink path loss reference signal from which to estimate the path loss, and may therefore not be able to determine a value of the estimated path loss parameter $P_L$.

In some cases, if UE 115-b determines an absence of a parameter at 315, the UE 115-b may identify this as an error condition. For example, it may be mandatory (e.g., specified by an industry standard) that a base station 105, such as the serving cell 105-d, configure the parameter determined to be absent. In some cases, the UE 115-b may refrain from transmitting the reference signal unless or until it identifies the parameter it has identified as absent. Additionally or alternatively, the UE 115-b may monitor for an indication (e.g., from the serving cell 105-d) of the parameter it has identified as absent. In some cases, UE 115-b may transmit, at 320, an error message to serving cell 105-d notifying serving cell 105-d of the absence of the parameter.

At 325, serving cell 105-d may determine a location of a non-serving cell 105-d that may be used to determine the position of UE 115-b by determining a time delay of a reference signal received from UE 115-b such as described with reference to FIG. 2. In some examples, a location server may determine the location of the non-serving call.

At 330, serving cell 105-d may transmit, to UE 115-b, an indication of a transmit power to be used by UE 115-b for transmitting the reference signal.

For example, in some cases, the indication of the transmit power may include a value of parameter $P_0$ (e.g., a value of a target receive power). This parameter value may be used, by UE 115-*b*, to calculate a transmit power using an equation such as Equation 1, for example.

In some cases, the indication of the transmit power may include a specific value of the transmit power. In this case, UE 115-*b* may not calculate the transmit power using an equation such as Equation 1 and may instead use the transmit power indicated by the value of the transmit power.

At 335, non-serving cell 105-*e* may transmit a message that may be intercepted (e.g., received, detected) by UE 115-*b*. For example, non-serving cell 105-*e* may broadcast a synchronization signal block (SSB) within a MIB. The SSB may include, for example, synchronization signals such as a Primary Synchronization Signal (PSS) or a Secondary Synchronization Signal (SSS). Such synchronization signals may be used, for example, by various UEs 115 in a wireless communications system 100 to synchronize communications with non-serving cell 105-*e* (which may be a serving cell for some UEs 115). In some cases, the UE 115-*b* may be able to use the SSB as a default path loss reference signal, such as for calculating a value of an estimated path loss PL in Equation 1.

At 340, UE 115-*b* may determine, based on determining the absence of the parameter, the transmit power. That is, UE 115-*b* may determine that it has not been provided with sufficient information to calculate a transmit power using (for example) Equation 1, and UE 115-*b* may therefore use one or more techniques for determining the transmit power in the absence of the parameter.

UE 115-*b* may determine the transmit power using a technique that may depend on, for example, how UE 115-*b* has been configured, whether UE 115-*b* has received an indication of the transmit power from serving cell 105-*d*, whether UE 115-*b* has intercepted a message from a non-serving cell 105-*b*, constraints on processing resources, bandwidth, and/or power consumption of UE 115 (or of a processor or other hardware within UE 115-*b*), and/or depending on other factors.

For example, for Technique 1, UE 115-*b* may determine the transmit power by using a maximum transmit power of the UE 115-*b*. The maximum transmit power of the UE 115-*b* may be configured for the UE 115-*b* (e.g., by serving cell 105-*d* or by another entity) or may be a physical characteristic of UE 115-*b*, for example. In some cases, this technique may provide a relatively simple approach that may not require additional information from the serving cell 105-*d* or may not require any calculations by UE 115-*b*, for example, and may therefore require less communication bandwidth and/or fewer processing resources.

For example, for Technique 2, UE 115-*b* may determine the transmit power by calculating the transmit power using a maximum value of the target receive power P0 in Equation 1 (or in a similar equation). The UE 115-*b* may determine a maximum value of the target receive power P0 based on configuration information stored at UE 115-*b* and/or based on configuration information received from serving cell 105-*d* or from another entity, for example. In some cases, UE 115-*b* may determine a maximum value of the target receive power P0 by selecting a maximum value from a table of values of target receive powers.

For example, for Technique 3, UE 115-*b* may determine the transmit power by determining a value of the target receive power P0 associated with PUSCH transmissions to the serving cell 105-*d*, and may increase this value by a fixed or variable offset, such as by 10 dB, and calculate (e.g., using Equation 1) the transmit power using the increased target receive power, thereby determining a transmit power that may be higher than the transmit power used for PUSCH transmissions to the serving cell 105-*d*.

For example, for Technique 4, UE 115-*b* may determine the transmit power using the indication of the transmit power received from serving cell 105-*d*.

For example, UE 115-*b* may determine the transmit power by setting the transmit power to a value of the transmit power that is received from serving cell 105-*d* in the indication of the transmit power. That is, in some cases, serving cell 105-*d* may explicitly indicate a transmit power for UE 115-*b* to use for transmitting the reference signal. In this case, UE 115-*b* may not need to calculate the transmit power, thereby potentially reducing processing overhead for UE 115-*b*.

For example, UE 115-*b* may determine the transmit power by calculating the transmit power using a value of a target receive power P0 that is received from serving cell 105-*d* in the indication of the transmit power. In some cases, the value of the target receive power P0 may be associated with the non-serving cell 105-*e*, and may be determined by the serving cell 105-*d* based on the location of the non-serving cell 105-*e*. In some cases, the serving cell 105-*d* may select the value of the target receive power P0 for the non-serving cell 105-*b* from a set of values of target receive powers P0 that may be different than a set of target receive powers P0 for the serving cell 105-*d*.

For example, for Technique 5, UE 115-*b* may determine the transmit power by using a message transmitted by non-serving cell 105-*e* to estimate a path loss value PL associated with the non-serving cell 105-*e*, which UE 115-*b* may then use for calculating the transmit power (e.g., using Equation 1 or another equation). In some cases, UE 115-*b* may use an SSB transmitted in a MIB from non-serving cell 105-*e* to estimate the path loss between UE 115-*b* and non-serving cell 105-*e*. This approach may provide an advantage in that the UE 115-*b* may be able to more accurately assess the effect of potential path losses between UE 115-*b* and non-serving cell 105-*e*, thereby potentially increasing the likelihood that the transmit power is sufficient to reach the non-serving cell 105-*e* without overestimating the transmit power.

In some cases, if the UE 115-*b* determines that the reference signal is associated with the positioning procedure and the UE 115-*b* determines that the positioning procedure includes transmission of the reference signal to a non-serving cell 105-*e* and the UE 115-*b* has not been provided with a downlink reference signal for path loss estimation (e.g, the UE 115-*b* determines an absence of a path loss parameter), UE 115-*b* may determine the transmit power based on, for example, Technique 1, Technique 4, or Technique 5. In some cases, UE 115-*b* may select Technique 1, Technique 4, or Technique 5 based on configuration information and/or based on various optimization criteria, such as optimization criteria associated with minimizing bandwidth, minimizing power consumption, minimizing the use of processing resources, minimizing latency, etc.

In some cases, UE 115-*b* may determine that the positioning procedure includes transmission of the reference signal to a non-serving cell 105-*e* based on information received from serving cell 105-*d*. For example, serving cell 105-*d* may transmit, to UE 115-*b*, an explicit indication that the positioning procedure includes transmission of the reference signal to the non-serving cell 105-*e*, such as explicit signaling indicating that a specific SRS configuration is intended for a non-serving cell 105-*e*. For example, serving cell 105-*d* may transmit, to UE 115-*b*, a cell identifier or sequence identifier associated with the non-serving cell 105-*e*.

In some cases, UE 115-*b* may determine that the positioning procedure includes transmission of the reference signal to a non-serving cell 105-*e* based on spatial relationship information associated with a reference signal received from non-serving cell 105-*e*. For example, UE 115-*b* may determine that a beam direction of a reference signal is associated with a non-serving cell 105-*e*.

In some cases, if the UE determines that the reference signal is associated with the positioning procedure and if the UE 115-*b* does not have information regarding the recipient of the reference signal (e.g., the UE 115-*b* cannot or does not determine whether the reference signal is intended to be received by a serving cell 105-*d*, by a non-serving cell 105-*e*, or both) or if the reference signal is intended to be received by both a serving cell 105-*d* and a non-serving cell 105-*e*, and the UE 115-*b* has not been provided with a downlink reference signal for estimating path loss, UE 115-*b* may determine the transmit power based on Technique 1 or Technique 4. In some cases, UE 115-*b* may select Technique 1 or Technique 4 based on configuration information and/or based on various optimization criteria, such as optimization criteria associated with minimizing bandwidth, minimizing power consumption, minimizing the use of processing resources, minimizing latency, etc.

In some cases, if the UE determines that the reference signal is associated with the positioning procedure and if the UE 115-*b* determines that the reference signal is intended to be received by a non-serving cell 105-*e*, and the UE 115-*b* has not been provided with a value of a target receive power P0 (e.g., UE 115-*b* determines an absence of a value of the target receive power P0), UE 115-*b* may determine the transmit power based on Technique 2, Technique 3, or Technique 4. In some cases, UE 115-*b* may select Technique 2, Technique 3, or Technique 4 based on configuration information and/or based on various optimization criteria, such as optimization criteria associated with minimizing bandwidth, minimizing power consumption, minimizing the use of processing resources, minimizing latency, etc.

In some cases, if the UE 115-*b* determines that the reference signal is used for other purposes (e.g., for purposes other than for the positioning procedure, which may include legacy purposes such supporting communications between the UE 115-*b* and the serving cell 105-*d*), then UE 115-*b* may determine the transmit power based on legacy approaches independent of whether the reference signal is also intended to be received by a non-serving cell 105-*e* during a positioning procedure. That is, UE 115-*b* may determine the transmit power based on Techniques 1-5 as described herein if the UE 115-*b* determines that the reference signal is not for (e.g., is not used for) other purposes, such as legacy purposes.

At 345, U 115-*b* may transmit the reference signal according to the transmit power determined at 340. For example, UE 115-*b* may transmit the reference signal to the non-serving cell 105-*e* and/or to the serving cell 105-*d*. In some cases, the UE 115-*b* may transmit or broadcast a single reference signal according to the transmit power that may be detected (e.g., received) by the serving cell 105-*c* and/or the non-serving cell 105-*d*.

Figure 4:
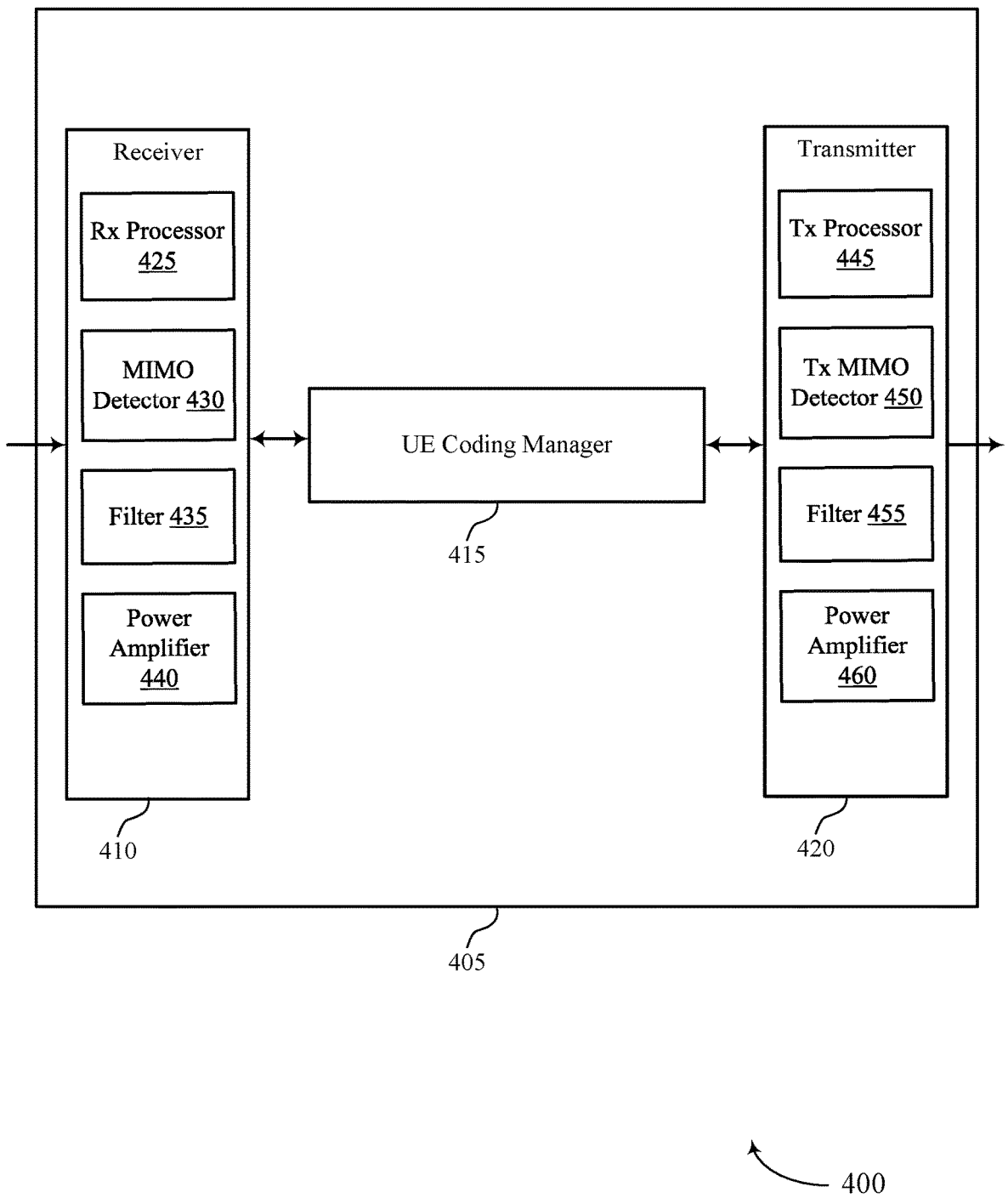
FIGS. 4 and 5 show block diagrams of devices that support transmit power control for positioning using non-serving cells in accordance with aspects of the present disclosure.

FIG. 4 shows a block diagram 400 of a device 405 that supports transmit power control for positioning using non-serving cells in accordance with aspects of the present disclosure. The device 405 may be an example of aspects of a UE 115 as described herein. The device 405 may include a receiver 410, a UE coding manager 415, and a transmitter 420. The device 405 may also include a processor. Each of these components may be in communication with one another (e.g., via one or more buses).

The receiver 410 may include an Rx processor 425, a MIMO detector 430, a filter 435, and a power amplifier 440. The receiver 410 may receive information such as packets, user data, or control information associated with various information channels (e.g., control channels, data channels, and information related to group delay timing accuracy for positioning in NR, etc.). Information may be passed on to other components of the device 405. The receiver 410 may be an example of aspects of the transceiver 720 as described with reference to FIG. 7. The receiver 410 may utilize a single antenna or a set of antennas. Each of these sub-components of the receiver 410 may be in communication with one another (e.g., via one or more buses). The receiver 410, or its sub-components, may be physically located at various positions, including being distributed such that portions of functions are implemented at different physical locations by one or more physical components. In some examples, the receiver 410, or its sub-components, may be a separate and distinct component in accordance with various aspects of the present disclosure.

The receiver 410 may receive signals from a wireless device and may provide the received signals to one or more demodulators (not shown). In some cases, the demodulator may be included in the Rx processor 425. A demodulator may condition (e.g., filter, amplify, downconvert, and digitize) a respective received signal to obtain input samples, and process the input samples (e.g., for OFDM, etc.) to obtain received symbols. A MIMO detector 420 may obtain received symbols from all the Rx processor 425, perform MIMO detection on the received symbols if applicable, and provide detected symbols. The Rx processor 425 may further process (e.g., demodulate, deinterleave, and decode) the detected symbols, providing decoded data for a receiving device to a data output, and providing decoded control information to the communications manager 415.

The UE Coding Manager 415 may determine that a reference signal is associated with a positioning procedure to identify a geographic location of the UE, determine, based on determining that the reference signal is associated with the positioning procedure, an absence of a value of a first parameter associated with a transmit power for transmitting the reference signal, determine, based on the absence of the value of the first parameter, the transmit power, and transmit, during the positioning procedure, the reference signal according to the transmit power. The UE Coding Manager 415 may also determine that a reference signal is associated with a positioning procedure to identify a geographic location of the UE, determine, based on determining that the reference signal is associated with the positioning procedure, an absence of a value of a first parameter associated with a transmit power for transmitting the reference signal, and transmit, to a serving cell, an error message indicating the absence of the value of the first parameter. The UE Coding Manager 415 may be an example of aspects of the UE Coding Manager 710 described herein.

The UE Coding Manager 415, or its sub-components, may be implemented in hardware, code (e.g., software or firmware) executed by a processor, or any combination thereof. If implemented in code executed by a processor, the functions of the UE Coding Manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. It may be understood that the UE coding manager 415, or its sub-components, may be implemented without a modem baseband or a processor. The UE coding manager 415, or its sub-components, may be implemented using a transceiver, a sensor core, an application processor, or any combination thereof. Additionally, or alternatively, one or more components included in the UE coding manager 415 may be implemented in the transceiver, the sensor core, the application processor, or any combination thereof.

The UE Coding Manager 415, or its sub-components, may be physically located at various positions, including being distributed such that portions of functions are implemented at different physical locations by one or more physical components. In some examples, the UE Coding Manager 415, or its sub-components, may be a separate and distinct component in accordance with various aspects of the present disclosure. In some examples, the UE Coding Manager 415, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 420 may include an Tx processor 445, a Tx MIMO detector 450, a filter 455, and a power amplifier 460. The transmitter 420 may transmit signals generated by other components of the device 405 (such as communications manager 415). In some examples, the transmitter 420 may be collocated with a receiver 410 in a transceiver module. For example, the transmitter 420 may be an example of aspects of the transceiver 720 as described with reference to FIG. 7. The transmitter 420 may utilize one or more antennas. Each of these sub-components of the transmitter 420 may be in communication with one another (e.g., via one or more buses). The transmitter 420, or its sub-components, may be physically located at various positions, including being distributed such that portions of functions are implemented at different physical locations by one or more physical components. In some examples, the transmitter 420, or its sub-components, may be a separate and distinct component in accordance with various aspects of the present disclosure.

In some cases, the Tx processor 445 may receive and process data from a data source. In some cases, the data source may be a positioning reference signal transmitted from the communications manager 415. The Tx processor 445 may also generate reference symbols for the reference signal. The symbols from the Tx processor 445 may be precoded by a Tx MIMO processor. In some cases, the Tx MIMO processor may be included in the Tx processor 445. The symbols may then be transmitted to a base station.

Figure 5:
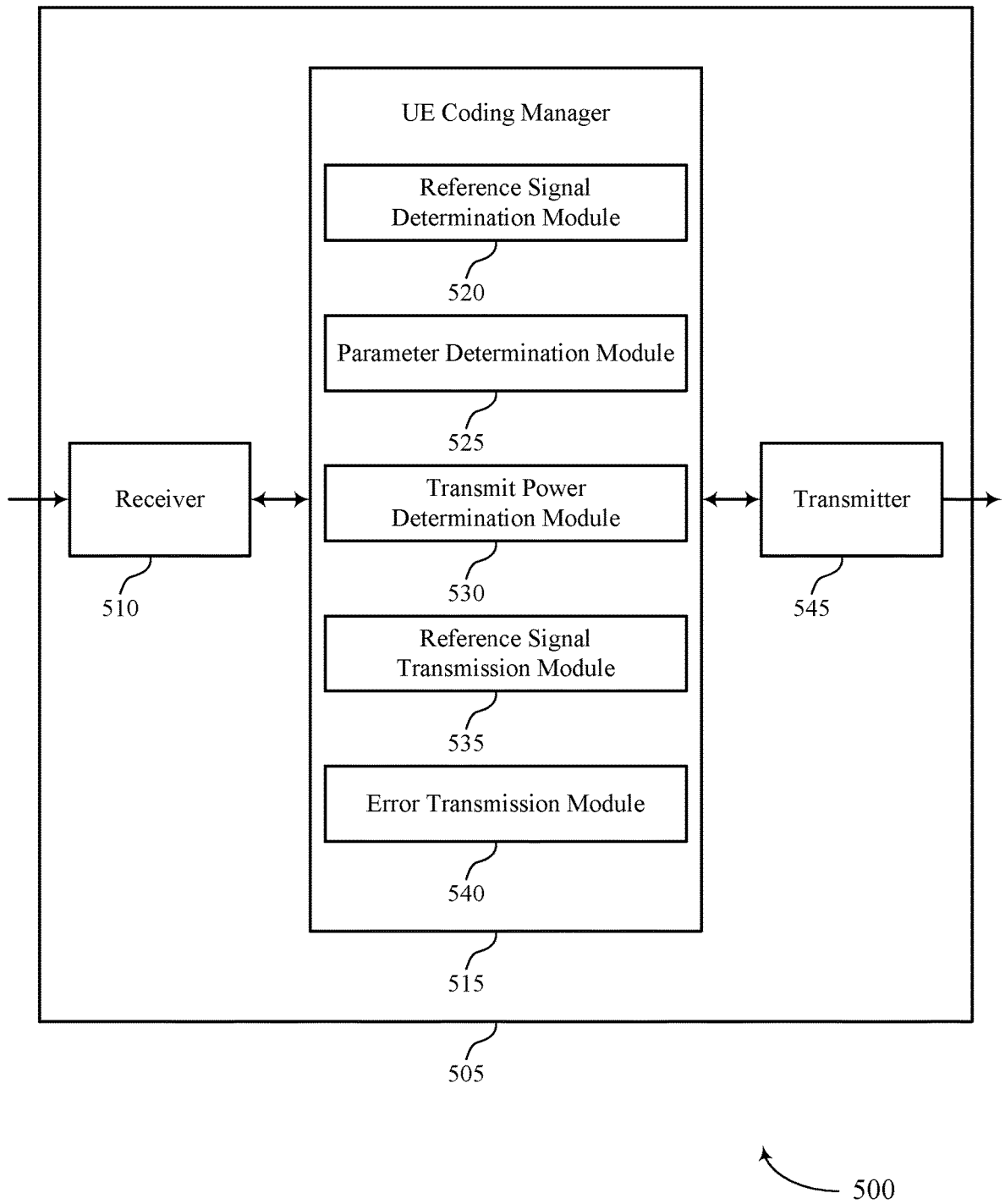

FIG. 5 shows a block diagram 500 of a device 505 that supports transmit power control for positioning using non-serving cells in accordance with aspects of the present disclosure. The device 505 may be an example of aspects of a device 405, or a UE 115 as described herein. The device 505 may include a receiver 510, a UE coding manager 515, and a transmitter 545. The device 505 may also include a processor. Each of these components may be in communication with one another (e.g., via one or more buses).

The receiver 510 may receive information such as packets, user data, or control information associated with various information channels (e.g., control channels, data channels, and information related to transmit power control for positioning using non-serving cells, etc.). Information may be passed on to other components of the device 505. The receiver 510 may be an example of aspects of the transceiver 720 described with reference to FIG. 7. The receiver 510 may utilize a single antenna or a set of antennas.

The UE Coding Manager 515 may be an example of aspects of the UE Coding Manager 415 as described herein. The UE Coding Manager 515 may include a reference signal determination module 520, a parameter determination module 525, a transmit power determination module 530, a reference signal transmission module 535, and an error transmission module 540. The UE Coding Manager 515 may be an example of aspects of the UE Coding Manager 710 described herein.

The reference signal determination module 520 may determine that a reference signal is associated with a positioning procedure to identify a geographic location of the UE.

The parameter determination module 525 may determine, based on determining that the reference signal is associated with the positioning procedure, an absence of a value of a first parameter associated with a transmit power for transmitting the reference signal.

The transmit power determination module 530 may determine, based on the absence of the value of the first parameter, the transmit power.

The reference signal transmission module 535 may transmit, during the positioning procedure, the reference signal according to the transmit power.

The error transmission module 540 may transmit, to a serving cell, an error message indicating the absence of the value of the first parameter.

The transmitter 545 may transmit signals generated by other components of the device 505. In some examples, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

Figure 6:
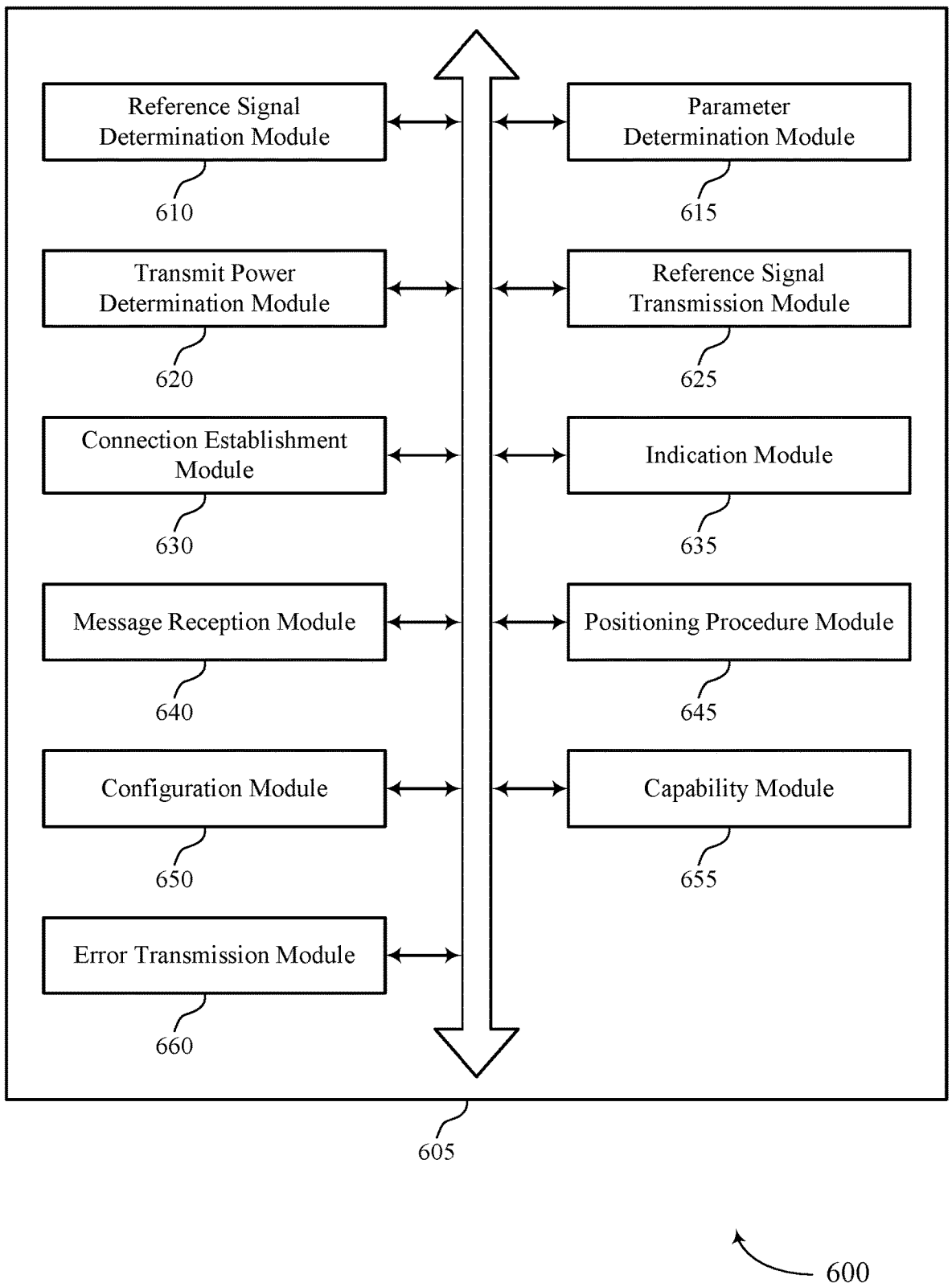
FIG. 6 shows a block diagram of a UE coding manager that supports transmit power control for positioning using non-serving cells in accordance with aspects of the present disclosure.

FIG. 6 shows a block diagram 600 of a UE Coding Manager 605 that supports transmit power control for positioning using non-serving cells in accordance with aspects of the present disclosure. The UE Coding Manager 605 may be an example of aspects of a UE Coding Manager 415, a UE Coding Manager 515, or a UE Coding Manager 710 described herein. The UE Coding Manager 605 may include a reference signal determination module 610, a parameter determination module 615, a transmit power determination module 620, a reference signal transmission module 625, a connection establishment module 630, an indication module 635, a message reception module 640, a positioning procedure module 645, a configuration module 650, a capability module 655, and an error transmission module 660. Each of these modules may communicate, directly or indirectly, with one another (e.g., via one or more buses).

The reference signal determination module 610 may determine that a reference signal is associated with a positioning procedure to identify a geographic location of the UE. In some cases, the reference signal includes an SRS associated with supporting communications between the UE and the base station based at least in part on supporting code-book based uplink communications, non-codebook-based uplink communications, antenna switching, uplink beam management, or any combination thereof.

The parameter determination module 615 may determine, based on determining that the reference signal is associated with the positioning procedure, an absence of a value of a first parameter associated with a transmit power for transmitting the reference signal. In some examples, the parameter determination module 615 may determine the absence of a downlink reference signal for estimating a path loss between the UE and the non-serving cell. In some examples, the parameter determination module 615 may determine a value of a target received power associated with an uplink shared channel transmission to a serving cell.

In some cases, the first parameter corresponds to a target received power at the non-serving cell, and the indication of the transmit power includes a first value of the first parameter, and where determining the transmit power includes calculating the transmit power based on the first value.

In some cases, the first parameter is associated with an estimated path loss, and where determining the absence of the value of the first parameter includes determining an absence of a downlink reference signal for estimating a path loss.

The transmit power determination module 620 may determine, based on the absence of the value of the first parameter, the transmit power. In some examples, the transmit power determination module 620 may determine a maximum transmit power associated with the UE and set the transmit power to the maximum transmit power.

In some examples, the transmit power determination module 620 may increase the value of a target received power by an offset amount, where determining the transmit power includes calculating the transmit power based on the increased value of the target received power.

In some examples, the transmit power determination module 620 may identify a maximum value of a target received power at a serving cell and calculate the transmit power based on the maximum value of the target received power.

In some examples, the transmit power determination module 620 may determine a first value of the first parameter based on a message, where determining the transmit power includes calculating the transmit power based at least in part on the first value of the first parameter.

In some examples, the transmit power determination module 620 may determine that the reference signal is not for (e.g., is unused for) supporting communications (e.g., between the UE and the base station), where determining the transmit power is based on the determination that the reference signal is not for supporting communications.

In some examples, the transmit power determination module 620 may determine an absence of information regarding whether the positioning procedure includes transmission of the reference signal to a serving cell, to a non-serving cell, or to both the serving cell and the non-serving cell, where determining the transmit power is based on determining the absence of information. In some cases, the serving cell is a first base station and the non-serving cell is a second base station.

The reference signal transmission module 625 may transmit, during the positioning procedure, the reference signal according to the transmit power. In some examples, transmitting the reference signal according to the transmit power includes transmitting the reference signal to a non-serving cell with the transmit power.

The error transmission module 660 may transmit, to a serving cell, an error message indicating the absence of the value of the first parameter.

The connection establishment module 630 may establish a connection with a serving cell.

The indication module 635 may receive, from the serving cell, an indication of the transmit power, where the transmit power is associated with a non-serving cell, and where determining the transmit power includes receiving the indication of the transmit power.

In some examples, the indication module 635 may receive an explicit indication that the reference signal is associated with the positioning procedure. In some examples, the indication module 635 may receive a positioning report configuration associated with the reference signal. In some examples, the indication module 635 may receive an indication that the reference signal is an uplink reference signal associated with a downlink positioning reference signal (PRS).

In some examples, the indication module 635 may receive, from the serving cell, an indication of a first value of the transmit power, where determining the transmit power is based on the first value of the transmit power.

In some cases, the indication of the transmit power includes a value of the transmit power, and where determining the transmit power includes setting the transmit power to the value of the transmit power.

The message reception module 640 may receive a message from a non-serving cell. In some cases, the message is received in a master information block from the non-serving cell.

The positioning procedure module 645 may determine that the positioning procedure includes transmission of the reference signal to a non-serving cell, where determining the transmit power is based on determining that the positioning procedure includes transmission of the reference signal to the non-serving cell.

In some examples, the positioning procedure module 645 may receive, from a serving cell, a cell identifier associated with the non-serving cell.

In some examples, the positioning procedure module 645 may receive, from a serving cell, a sequence identifier associated with the non-serving cell.

In some examples, the positioning procedure module 645 may determine spatial relationship information associated with a second reference signal received from the non-serving cell. In some cases, the spatial relationship information includes a direction of a transmit beam towards the non-serving cell.

The configuration module 650 may receive configuration information indicating a method for determining the transmit power, where determining the transmit power is based on the configuration information.

The capability module 655 may determine a power capability of the UE, where determining the transmit power is based on the power capability of the UE.

The error transmission module 660 may transmit an error message and/or an indication of the absence of the value of the first parameter.

Figure 7:
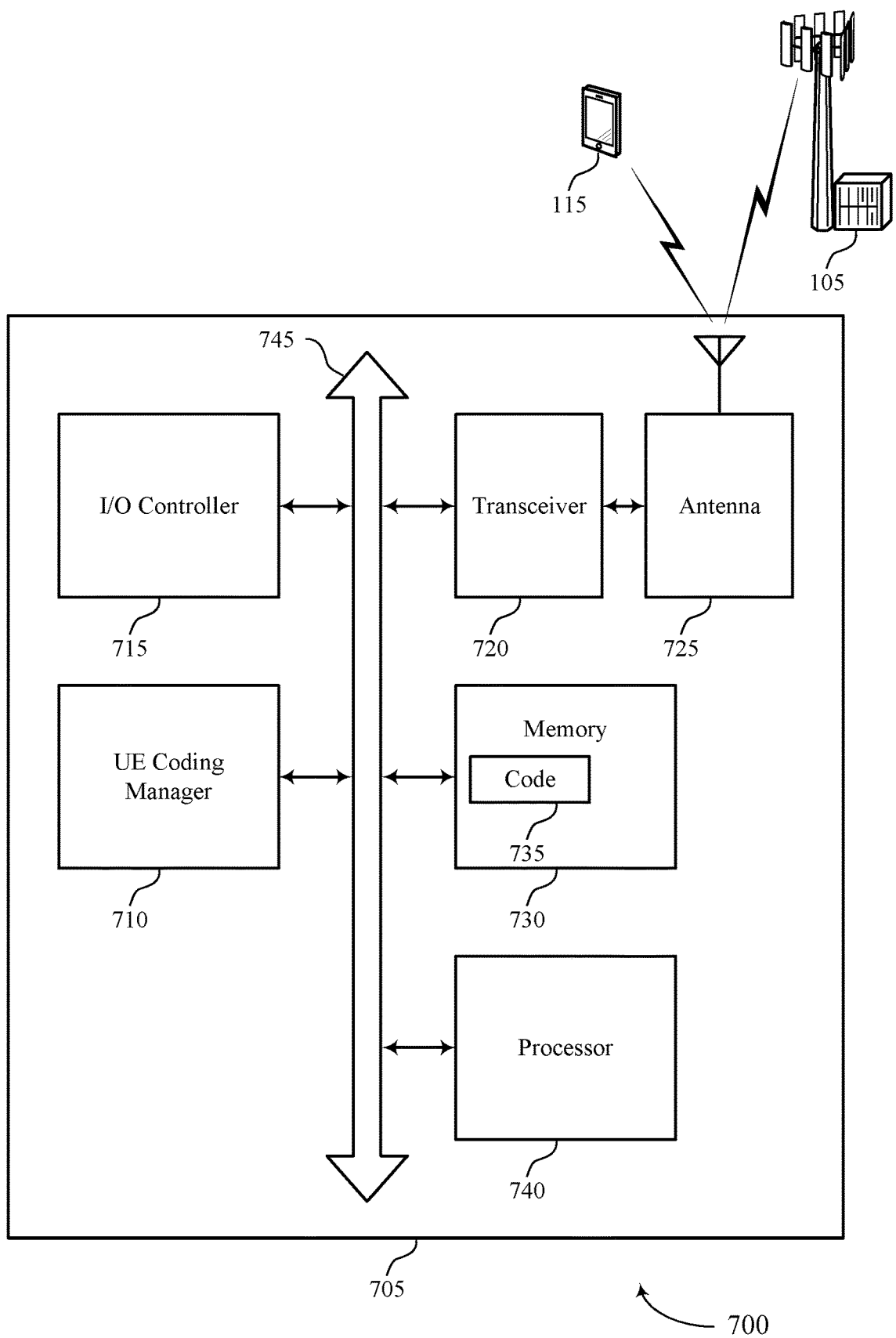
FIG. 7 shows a diagram of a system including a device that supports transmit power control for positioning using non-serving cells in accordance with aspects of the present disclosure.

FIG. 7 shows a diagram of a system 700 including a device 705 that supports transmit power control for positioning using non-serving cells in accordance with aspects of the present disclosure. The device 705 may be an example of or include the components of device 405, device 505, or a UE 115 as described herein. The device 705 may include components for bi-directional voice and data communications including components for transmitting and receiving communications, including an UE coding manager 710, an I/O controller 715, a transceiver 720, an antenna 725, memory 730, and a processor 740. These components may be in electronic communication via one or more buses (e.g., bus 745).

The UE Coding Manager 710 may determine that a reference signal is associated with a positioning procedure to identify a geographic location of the UE, determine, based on determining that the reference signal is associated with the positioning procedure, an absence of a value of a first parameter associated with a transmit power for transmitting the reference signal, determine, based on the absence of the value of the first parameter, the transmit power, and transmit, during the positioning procedure, the reference signal according to the transmit power. The UE Coding Manager 710 may also determine that a reference signal is associated with a positioning procedure to identify a geographic location of the UE, determine, based on determining that the reference signal is associated with the positioning procedure, an absence of a value of a first parameter associated with a transmit power for transmitting the reference signal, and transmit, to a serving cell, an error message indicating the absence of the value of the first parameter.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting transmit power control for positioning using non-serving cells).

The code 735 may include instructions to implement aspects of the present disclosure, including instructions to support transmit power control for positioning using non-serving cells. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
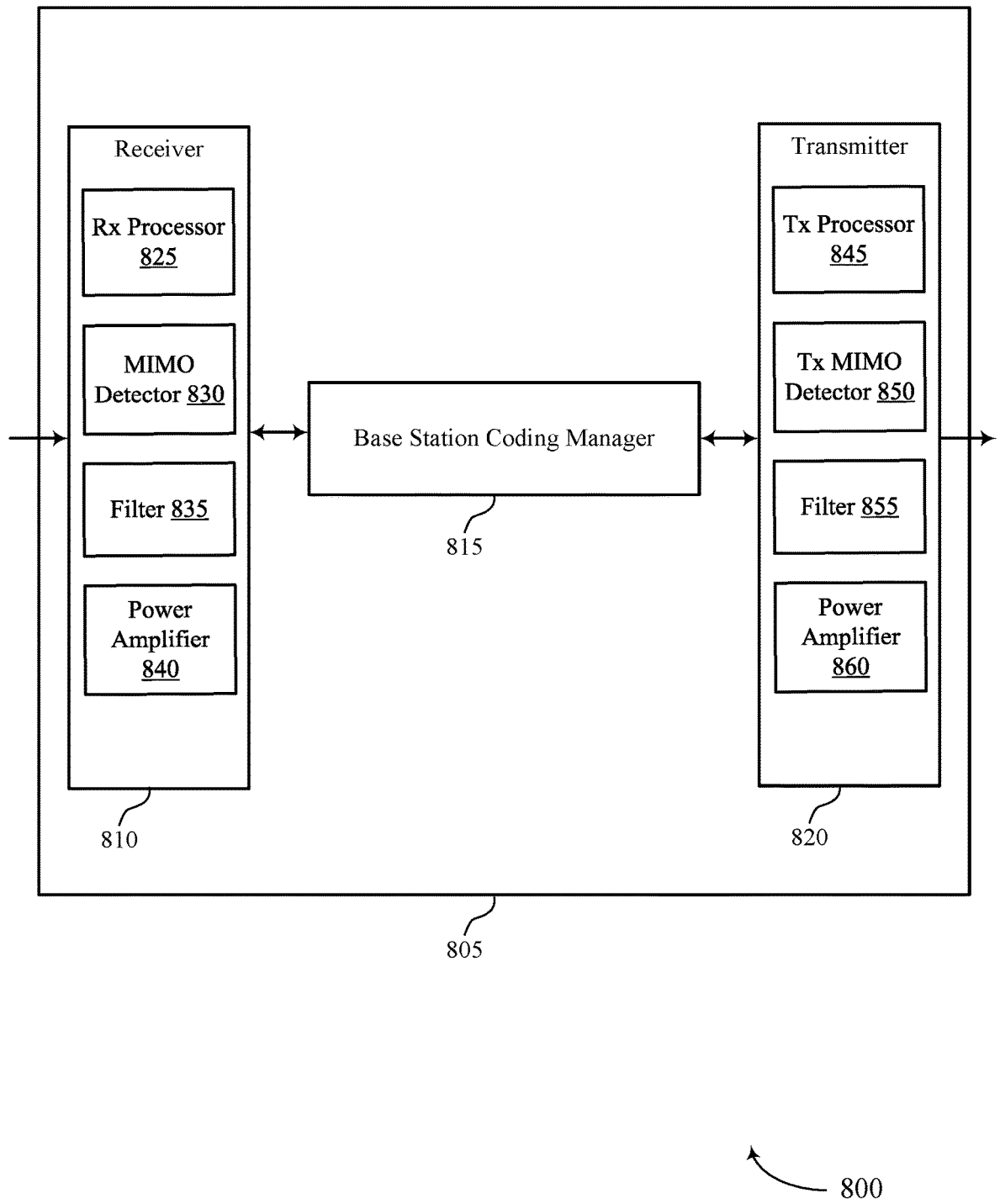
FIGS. 8 and 9 show block diagrams of devices that support transmit power control for positioning using non-serving cells in accordance with aspects of the present disclosure.

FIG. 8 shows a block diagram 800 of a device 805 that supports transmit power control for positioning using non-serving cells in accordance with aspects of the present disclosure. The device 805 may be an example of aspects of a base station 105 as described herein. The device 805 may include a receiver 810, a base station coding manager 815, and a transmitter 820. The device 805 may also include a processor. Each of these components may be in communication with one another (e.g., via one or more buses).

The receiver 810 may include an Rx processor 825, a MIMO detector 830, a filter 835, and a power amplifier 840. The receiver 810 may receive information such as packets, user data, or control information associated with various information channels (e.g., control channels, data channels, and information related to group delay timing accuracy for positioning in NR, etc.). Information may be passed on to other components of the device 805. The receiver 810 may be an example of aspects of the transceiver 1120 as described with reference to FIG. 11. The receiver 810 may utilize a single antenna or a set of antennas. Each of these sub-components of the receiver 810 may be in communication with one another (e.g., via one or more buses). The receiver 810, or its sub-components, may be physically located at various positions, including being distributed such that portions of functions are implemented at different physical locations by one or more physical components. In some examples, the receiver 810, or its sub-components, may be a separate and distinct component in accordance with various aspects of the present disclosure.

The receiver 810 may receive signals from a wireless device and may provide the received signals to one or more demodulators (not shown). In some cases, the demodulator may be included in the Rx processor 825. A demodulator may condition (e.g., filter, amplify, downconvert, and digitize) a respective received signal to obtain input samples, and process the input samples (e.g., for OFDM, etc.) to obtain received symbols. A MIMO detector 820 may obtain received symbols from all the Rx processor 825, perform MIMO detection on the received symbols if applicable, and provide detected symbols. The Rx processor 825 may further process (e.g., demodulate, deinterleave, and decode) the detected symbols, providing decoded data for a receiving device to a data output, and providing decoded control information to the communications manager 815.

The Base Station Coding Manager 815 may initiate establishment of a connection between a UE as a serving cell for the UE, transmit, to the UE, an indication that a reference signal is associated with a positioning procedure to identify a geographic location of the UE, the positioning procedure including a transmission of the reference signal from the UE to a non-serving cell, determine a distance of the non-serving cell from the UE, determine, based on the distance of the non-serving cell from the UE, a parameter associated with a transmit power for the transmission of the reference signal from the UE to the non-serving cell during the positioning procedure, and transmit the parameter to the UE.

The Base Station Coding Manager 815 may be an example of aspects of the Base Station Coding Manager 1110 described herein.

The Base Station Coding Manager 815, or its sub-components, may be implemented in hardware, code (e.g., software or firmware) executed by a processor, or any combination thereof. If implemented in code executed by a processor, the functions of the Base Station Coding Manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. It may be understood that the communications manager 915, or its sub-components, may be implemented without a modem baseband or a processor. The communications manager 915, or its sub-components, may be implemented using a transceiver, a sensor core, an application processor, or any combination thereof. Additionally, or alternatively, one or more components included in the communications manager 915 may be implemented in the transceiver, the sensor core, the application processor, or any combination thereof.

The Base Station Coding Manager 815, or its sub-components, may be physically located at various positions, including being distributed such that portions of functions are implemented at different physical locations by one or more physical components. In some examples, the Base Station Coding Manager 815, or its sub-components, may be a separate and distinct component in accordance with various aspects of the present disclosure. In some examples, the Base Station Coding Manager 815, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 820 may include an Tx processor 845, a Tx MIMO detector 850, a filter 855, and a power amplifier 860. The transmitter 820 may transmit signals generated by other components of the device 805 (such as Base Station Coding Manager 815). In some examples, the transmitter 820 may be collocated with a receiver 810 in a transceiver module. For example, the transmitter 820 may be an example of aspects of the transceiver 1120 as described with reference to FIG. 11. The transmitter 820 may utilize one or more antennas. Each of these sub-components of the transmitter 820 may be in communication with one another (e.g., via one or more buses). The transmitter 820, or its sub-components, may be physically located at various positions, including being distributed such that portions of functions are implemented at different physical locations by one or more physical components. In some examples, the transmitter 820, or its sub-components, may be a separate and distinct component in accordance with various aspects of the present disclosure.

In some cases, the Tx processor 845 may receive and process data from a data source. In some cases, the data source may be a positioning reference signal transmitted from the communications manager 815. The Tx processor 845 may also generate reference symbols for the reference signal. The symbols from the Tx processor 845 may be precoded by a Tx MIMO processor. In some cases, the Tx MIMO processor may be included in the Tx processor 845. The symbols may then be transmitted to a base station.

Figure 9:
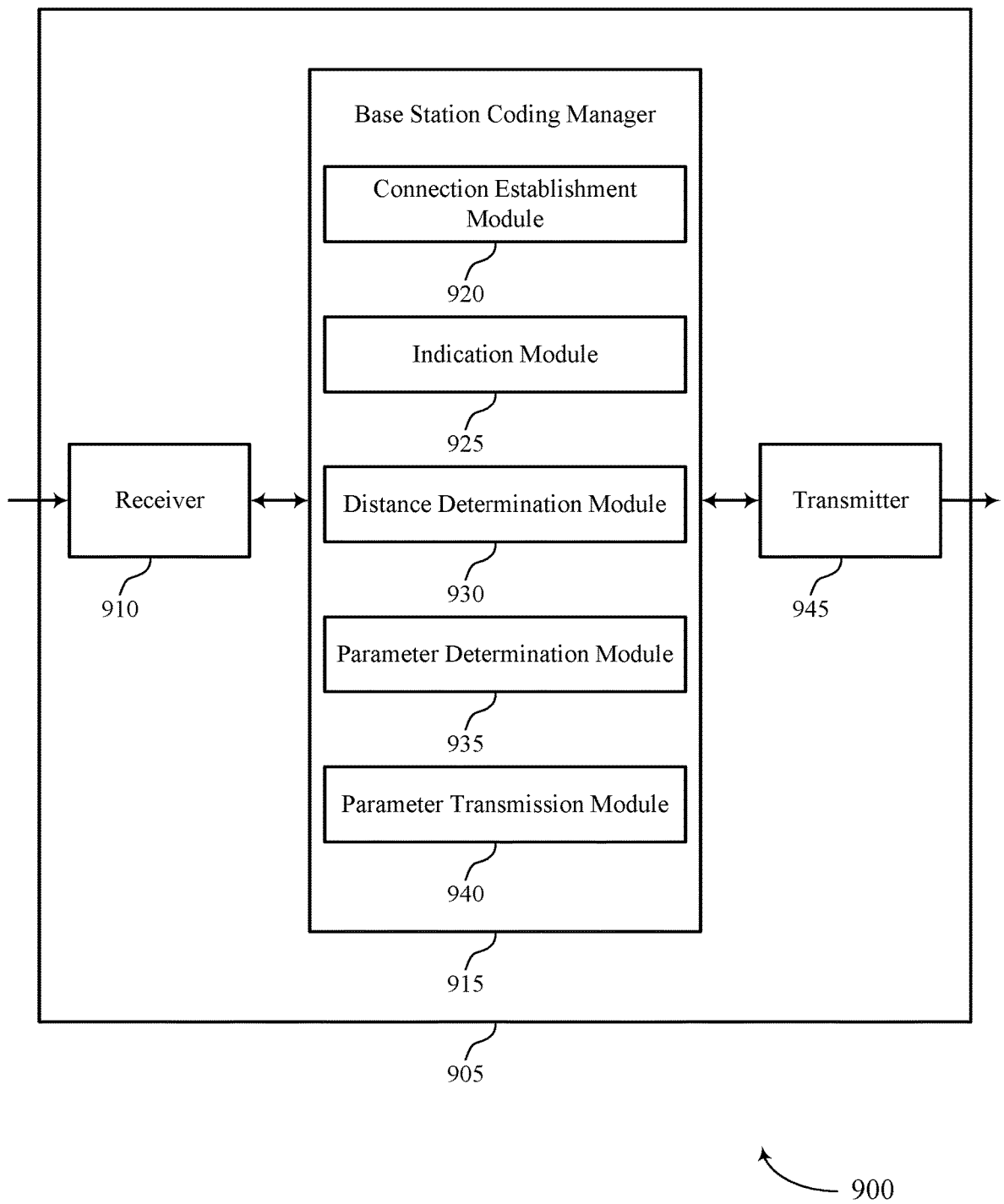

FIG. 9 shows a block diagram 900 of a device 905 that supports transmit power control for positioning using non-serving cells in accordance with aspects of the present disclosure. The device 905 may be an example of aspects of a device 805, or a base station 105 as described herein. The device 905 may include a receiver 910, a base station coding manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to transmit power control for positioning using non-serving cells, etc.). Information may be passed on to other components of the device 905. The receiver 910 may be an example of aspects of the transceiver 1120 described with reference to FIG. 11. The receiver 910 may utilize a single antenna or a set of antennas.

The Base Station Coding Manager 915 may be an example of aspects of the Base Station Coding Manager 815 as described herein. The Base Station Coding Manager 915 may include a connection establishment module 920, an indication module 925, a distance determination module 930, a parameter determination module 935, and a parameter transmission module 940. The Base Station Coding Manager 915 may be an example of aspects of the Base Station Coding Manager 1110 described herein.

The connection establishment module 920 may initiate establishment of a connection between a UE as a serving cell for the UE.

The indication module 925 may transmit, to the UE, an indication that a reference signal is associated with a positioning procedure to identify a geographic location of the UE, the positioning procedure including a transmission of the reference signal from the UE to a non-serving cell.

The distance determination module 930 may determine a distance of the non-serving cell from the UE.

The parameter determination module 935 may determine, based on the distance of the non-serving cell from the UE, a parameter associated with a transmit power for the transmission of the reference signal from the UE to the non-serving cell during the positioning procedure.

The parameter transmission module 940 may transmit the parameter to the UE.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
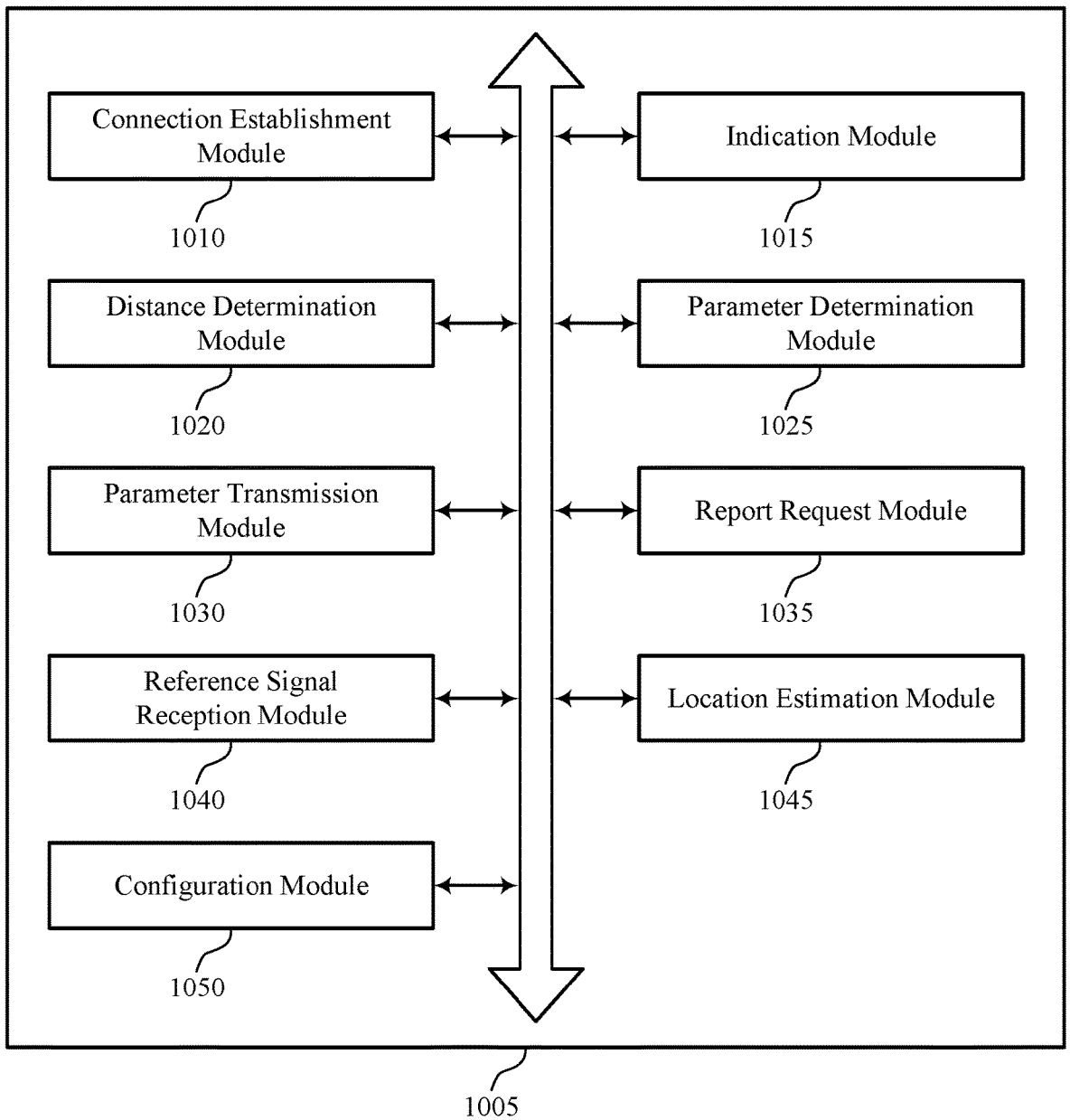
FIG. 10 shows a block diagram of a base station coding manager that supports transmit power control for positioning using non-serving cells in accordance with aspects of the present disclosure.

FIG. 10 shows a block diagram 1000 of a Base Station Coding Manager 1005 that supports transmit power control for positioning using non-serving cells in accordance with aspects of the present disclosure. The Base Station Coding Manager 1005 may be an example of aspects of a Base Station Coding Manager 815, a Base Station Coding Manager 915, or a Base Station Coding Manager 1110 described herein. The Base Station Coding Manager 1005 may include a connection establishment module 1010, an indication module 1015, a distance determination module 1020, a parameter determination module 1025, a parameter transmission module 1030, a report request module 1035, a reference signal reception module 1040, a location estimation module 1045, and a configuration module 1050. Each of these modules may communicate, directly or indirectly, with one another (e.g., via one or more buses).

The connection establishment module 1010 may initiate establishment of a connection between a UE as a serving cell for the UE.

The indication module 1015 may transmit, to the UE, an indication that a reference signal is associated with a positioning procedure to identify a geographic location of the UE, the positioning procedure including a transmission of the reference signal from the UE to a non-serving cell. In some examples, the indication module 1015 may transmit, to the UE, an explicit indication that the reference signal is associated with the positioning procedure. In some examples, the indication module 1015 may transmit, to the UE, an indication that a downlink positioning reference signal (PRS) is associated with the reference signal.

In some examples, the indication module 1015 may transmit, to the UE, a cell identifier associated with the non-serving cell.

In some examples, the indication module 1015 may transmit, to the UE, a sequence identifier associated with the non-serving cell.

In some examples, the indication module 1015 may transmit, to the UE, an indication that the reference signal is for supporting communications between the UE and the base station.

In some examples, the indication module 1015 may receive, from the UE, an indication of an absence of a value of a first parameter associated with a transmit power for the transmission of the reference signal from the UE to the non-serving cell.

In some examples, the indication module 1015 may transmit, to the UE, an indication of a first value of the transmit power.

In some cases, the reference signal is an SRS associated with supporting communications between the UE and the base station based at least in part on supporting code-book based uplink communications, non-codebook-based uplink communications, antenna switching, uplink beam management, or any combination thereof.

The distance determination module 1020 may determine a distance of the non-serving cell from the UE.

The parameter determination module 1025 may determine, based on the distance of the non-serving cell from the UE, a parameter associated with a transmit power for the transmission of the reference signal from the UE to the non-serving cell during the positioning procedure.

In some examples, the parameter determination module 1025 may determine a second parameter associated with a second transmit power for the transmission of the reference signal to the base station during the positioning procedure.

In some cases, the parameter includes a value of the transmit power.

In some cases, the parameter includes a target received power at the non-serving cell.

In some cases, the second parameter is different than the parameter.

The parameter transmission module 1030 may transmit the parameter to the UE. In some examples, the parameter transmission module 1030 may transmit the second parameter to the UE.

The report request module 1035 may transmit, to the UE, a request for a positioning report associated with the reference signal.

The reference signal reception module 1040 may receive the reference signal from the UE.

The location estimation module 1045 may estimate, based on the reference signal, a time delay associated with receiving the reference signal from the UE, wherein the time delay is associated with estimating a geographic location of the UE.

The configuration module 1050 may transmit, to the UE, configuration information indicating a method for determining the transmit power.

Figure 11:
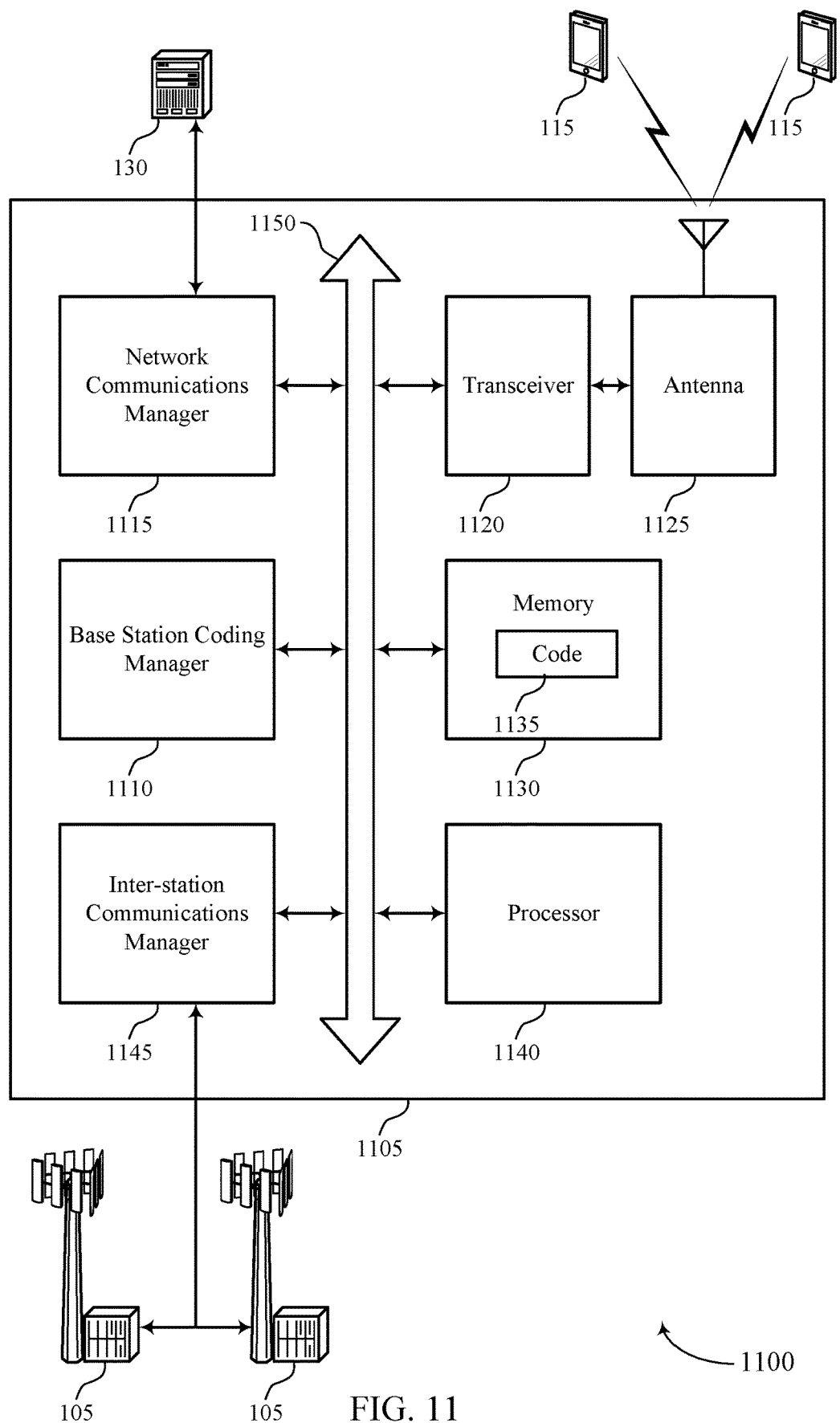
FIG. 11 shows a diagram of a system including a device that supports transmit power control for positioning using non-serving cells in accordance with aspects of the present disclosure.

FIG. 11 shows a diagram of a system 1100 including a device 1105 that supports transmit power control for positioning using non-serving cells in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station coding manager 1110, a network communications manager 1115, a transceiver 1120, an antenna 1125, memory 1130, a processor 1140, and an inter-station communications manager 1145. These components may be in electronic communication via one or more buses (e.g., bus 1150).

The Base Station Coding Manager 1110 may initiate establishment of a connection between a UE as a serving cell for the UE, transmit, to the UE, an indication that a reference signal is associated with a positioning procedure to identify a geographic location of the UE, the positioning procedure including a transmission of the reference signal from the UE to a non-serving cell, determine a distance of the non-serving cell from the UE, determine, based on the distance of the non-serving cell from the UE, a parameter associated with a transmit power for the transmission of the reference signal from the UE to the non-serving cell during the positioning procedure, and transmit the parameter to the UE.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or any combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting transmit power control for positioning using non-serving cells).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support PREAMBLE. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
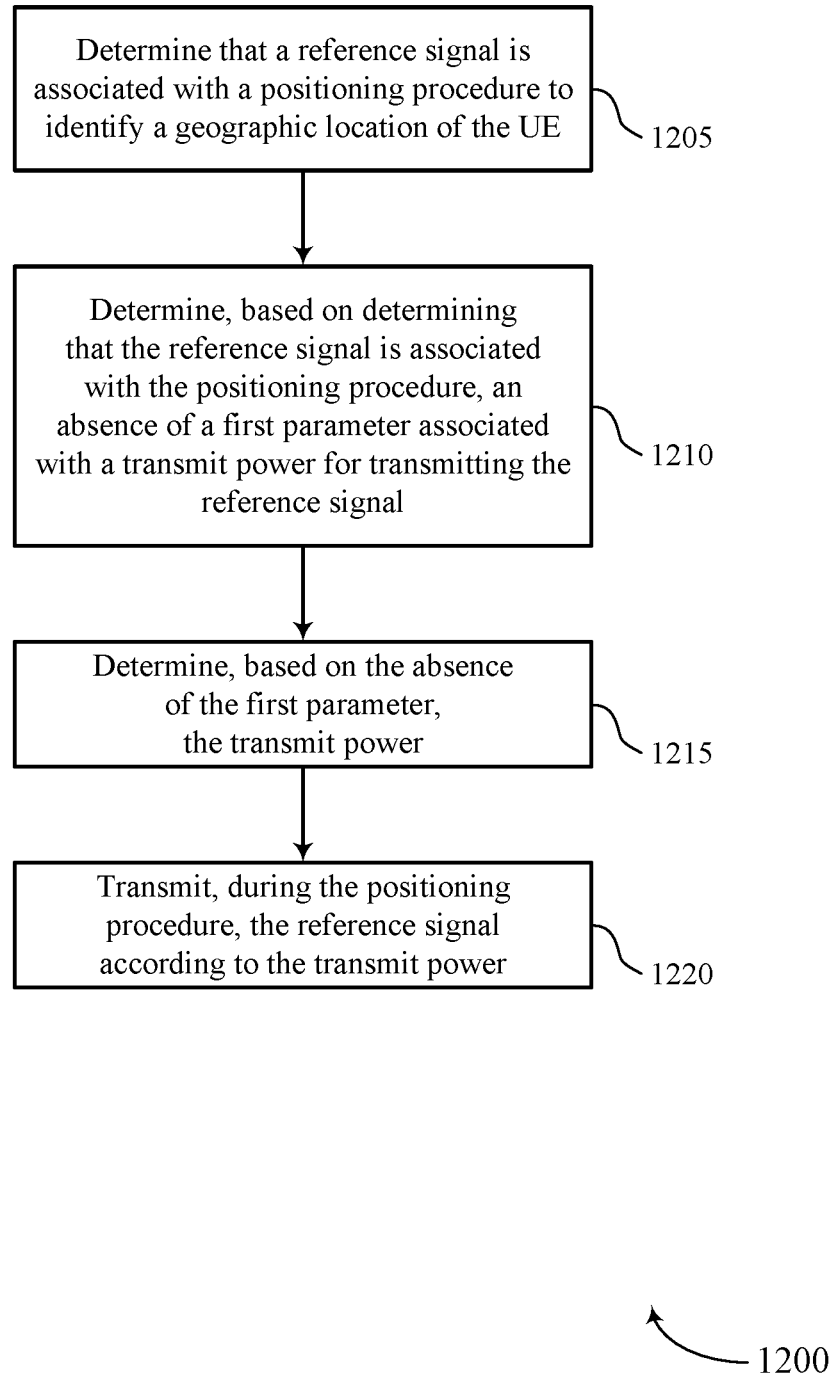
FIGS. 12 through 14 show flowcharts illustrating methods that support transmit power control for positioning using non-serving cells in accordance with aspects of the present disclosure.

FIG. 12 shows a flowchart illustrating a method 1200 that supports transmit power control for positioning using non-serving cells in accordance with aspects of the present disclosure. The operations of method 1200 may be implemented by a UE 115 or its components as described herein. For example, the operations of method 1200 may be performed by a UE Coding Manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may determine that a reference signal is associated with a positioning procedure to identify a geographic location of the UE. The operations of 1205 may be performed according to the methods described herein. In some examples, aspects of the operations of 1205 may be performed by a reference signal determination module as described with reference to FIGS. 4 through 7.

At 1210, the UE may determine, based on determining that the reference signal is associated with the positioning procedure, an absence of a first parameter associated with a transmit power for transmitting the reference signal. The operations of 1210 may be performed according to the methods described herein. In some examples, aspects of the operations of 1210 may be performed by a parameter determination module as described with reference to FIGS. 4 through 7.

At 1215, the UE may determine, based on the absence of the first parameter, the transmit power. The operations of 1215 may be performed according to the methods described herein. In some examples, aspects of the operations of 1215 may be performed by a transmit power determination module as described with reference to FIGS. 4 through 7.

At 1220, the UE may transmit, during the positioning procedure, the reference signal according to the transmit power. The operations of 1220 may be performed according to the methods described herein. In some examples, aspects of the operations of 1220 may be performed by a reference signal transmission module as described with reference to FIGS. 4 through 7.

Figure 13:
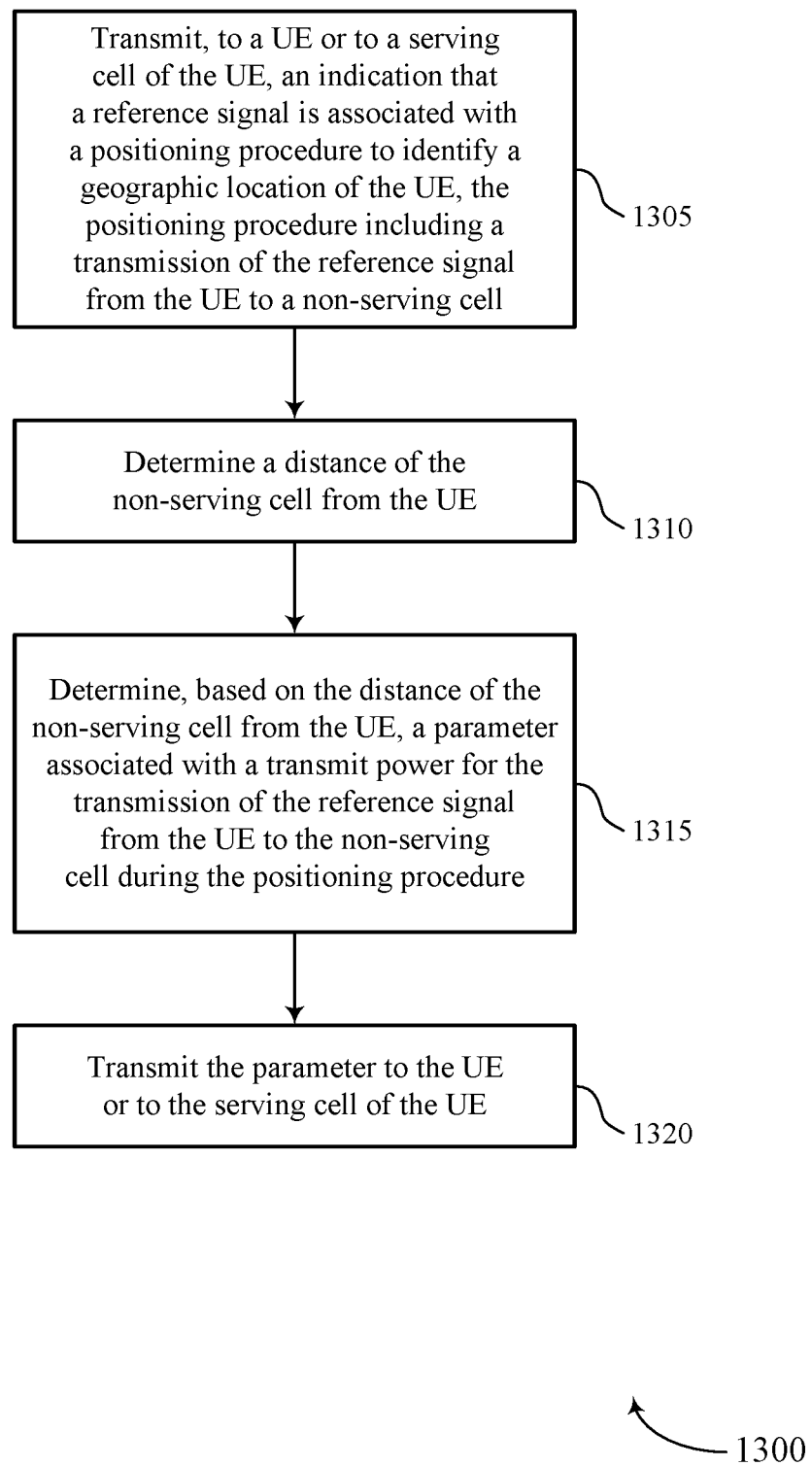

FIG. 13 shows a flowchart illustrating a method 1300 that supports transmit power control for positioning using non-serving cells in accordance with aspects of the present disclosure. The operations of method 1300 may be implemented by a network entity, such as a location server, or a base station 105 or its components as described herein. For example, the operations of method 1300 may be performed by a Base Station Coding Manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1305, a network entity may transmit, to a UE or to a serving cell of the UE, an indication that a reference signal is associated with a positioning procedure to identify a geographic location of the UE, the positioning procedure including a transmission of the reference signal from the UE to a non-serving cell. The operations of 1305 may be performed according to the methods described herein. In some examples, aspects of the operations of 1310 may be performed by an indication module as described with reference to FIGS. 8 through 11.

At 1310, the network entity may determine a distance of the non-serving cell from the UE. The operations of 1310 may be performed according to the methods described herein. In some examples, aspects of the operations of 1310 may be performed by a distance determination module as described with reference to FIGS. 8 through 11.

At 1315, the network entity may determine, based on the distance of the non-serving cell from the UE, a parameter associated with a transmit power for the transmission of the reference signal from the UE to the non-serving cell during the positioning procedure. The operations of 1315 may be performed according to the methods described herein. In some examples, aspects of the operations of 1315 may be performed by a parameter determination module as described with reference to FIGS. 8 through 11.

At 1320, the network entity may transmit the parameter to the UE or to the serving cell of the UE. In some examples, the network entity transmitting the parameter to the UE or to the serving cell of the UE includes a base station transmitting the parameter to the UE. In another example, the network entity transmitting the parameter to the UE or to the serving cell of the UE includes a base station transmitting the parameter to the UE. The operations of 1320 may be performed according to the methods described herein. In some examples, aspects of the operations of 1320 may be performed by a parameter transmission module as described with reference to FIGS. 8 through 11.

Figure 14:
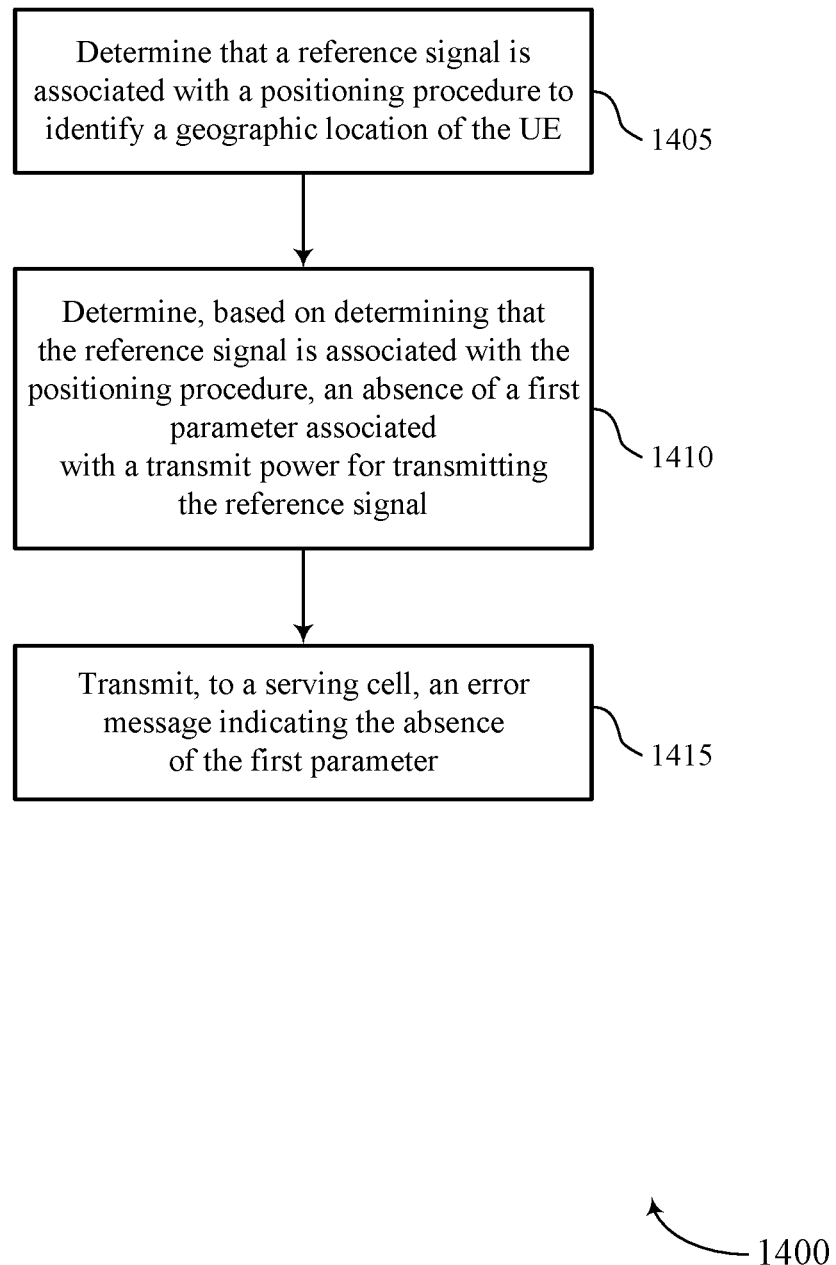

FIG. 14 shows a flowchart illustrating a method 1400 that supports transmit power control for positioning using non-serving cells in accordance with aspects of the present disclosure. The operations of method 1400 may be implemented by a UE 115 or its components as described herein. For example, the operations of method 1400 may be performed by a UE Coding Manager as described with reference to FIGS. 4 through 7. In some examples, a UE may execute a set of instructions to control the functional elements of the UE to perform the functions described below.

Additionally or alternatively, a UE may perform aspects of the functions described below using special-purpose hardware.

At 1405, the UE may determine that a reference signal is associated with a positioning procedure to identify a geographic location of the UE. The operations of 1405 may be performed according to the methods described herein. In some examples, aspects of the operations of 1405 may be performed by a reference signal determination module as described with reference to FIGS. 4 through 7.

At 1410, the UE may determine, based on determining that the reference signal is associated with the positioning procedure, an absence of a first parameter associated with a transmit power for transmitting the reference signal. The operations of 1410 may be performed according to the methods described herein. In some examples, aspects of the operations of 1410 may be performed by a parameter determination module as described with reference to FIGS. 4 through 7.

At 1415, the UE may transmit, to a serving cell, an error message indicating the absence of the first parameter. The operations of 1415 may be performed according to the methods described herein. In some examples, aspects of the operations of 1415 may be performed by an error transmission module as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE) comprising:
   one or more transceivers;
   one or more memories; and
   one or more processors electronically coupled with the one or more memories and the one or more transceivers, the one or more processors configured to cause the apparatus to:
   establish a connection with a serving cell;
   receive a control message comprising configuration information for an uplink reference signal associated with a positioning procedure to identify a geographic location of the UE, wherein a first parameter associated with a transmit power for the uplink reference signal is excluded from the configuration information received in the control message, wherein the exclusion of the first parameter comprises the configuration information in the received control message excluding an indication of a downlink reference signal for estimating a path loss between the UE and the serving cell and also excluding an indication of a downlink reference signal for estimating a path loss between the UE and a cell other than the serving cell, and wherein the exclusion of the first parameter from the configuration information is associated with a determination procedure that is associated with a cell other than the serving cell;
   receive a message from the cell other than the serving cell;
   determine, as part of the determination procedure, a first value of the first parameter based at least in part on the message from the cell other than the serving cell and based at least in part on the exclusion of the first parameter from the configuration information received in the control message;
   determine the transmit power for the uplink reference signal based at least in part on the first value of the first parameter; and
   transmit, via the one or more transceivers and during the positioning procedure, the uplink reference signal according to the transmit power.

2. The apparatus of claim 1, wherein the first parameter corresponds to a target received power at the cell other than the serving cell.

3. The apparatus of claim 1, wherein:
   the first parameter corresponds to a reference path loss associated with a signal degradation between the UE and the cell other than the serving cell.

4. The apparatus of claim 1, wherein, to transmit the uplink reference signal according to the transmit power, the one or more processors are configured to cause the apparatus to:
   transmit the uplink reference signal to the cell other than the serving cell with the transmit power.

5. The apparatus of claim 1, wherein, to determine the transmit power, the one or more processors are configured to cause the apparatus to:
   determine a maximum transmit power associated with the UE; and set the transmit power based at least in part on the maximum transmit power.

6. The apparatus of claim 1, wherein the one or more processors are configured to cause the apparatus to receive the message in a master information block from the cell other than the serving cell.

7. The apparatus of claim 1, wherein, to determine that the uplink reference signal is associated with the positioning procedure, the one or more processors are configured to cause the apparatus to:
receive an explicit indication that the uplink reference signal is associated with the positioning procedure.

8. The apparatus of claim 1, wherein, to determine that the uplink reference signal is associated with the positioning procedure, the one or more processors are configured to cause the apparatus to:
receive a positioning report configuration associated with the uplink reference signal or an indication that the uplink reference signal is associated with a downlink positioning reference signal (PRS).

9. The apparatus of claim 1, wherein the uplink reference signal comprises a sounding reference signal (SRS) associated with supporting communications between the UE and a base station based at least in part on supporting one of code-book based uplink communications, non-codebook-based uplink communications, antenna switching, uplink beam management, or any combination thereof.

10. The apparatus of claim 9, wherein, to determine the transmit power, the one or more processors are configured to cause the apparatus to:
determine that the uplink reference signal is not for supporting communications between the UE and the base station.

11. The apparatus of claim 1, wherein, to determine the transmit power, the one or more processors are configured to cause the apparatus to:
determine an absence of information regarding whether the positioning procedure comprises transmission of the uplink reference signal to the serving cell, to the cell other than the serving cell, or to both the serving cell and the cell other than the serving cell.

12. The apparatus of claim 1, wherein, to determine the transmit power, the one or more processors are configured to cause the apparatus to:
determine that the positioning procedure comprises transmission of the uplink reference signal to the cell other than the serving cell.

13. The apparatus of claim 12, wherein, to determine that the positioning procedure comprises transmission of the uplink reference signal to the cell other than the serving cell, the one or more processors are configured to cause the apparatus to:
receive, from the serving cell, a cell identifier or a sequence identifier associated with the cell other than the serving cell.

14. The apparatus of claim 12, wherein, to determine that the positioning procedure comprises transmission of the uplink reference signal to the cell other than the serving cell, the one or more processors are configured to cause the apparatus to:
determine spatial relationship information associated with a second reference signal received from the cell other than the serving cell.

15. The apparatus of claim 14, wherein the spatial relationship information comprises a direction of a transmit beam towards the cell other than the serving cell.

16. A method for wireless communications at a user equipment (UE), comprising:
establishing a connection with a serving cell;
receiving a control message comprising configuration information for an uplink reference signal associated with a positioning procedure to identify a geographic location of the UE, wherein a first parameter associated with a transmit power for the uplink reference signal is excluded from the configuration information received in the control message, wherein the exclusion of the first parameter comprises the configuration information in the received control message excluding an indication of a downlink reference signal for estimating a path loss between the UE and the serving cell and also excluding an indication of a downlink reference signal for estimating a path loss between the UE and a cell other than the serving cell, and wherein the exclusion of the first parameter from the configuration information is associated with a determination procedure that is associated with a cell other than the serving cell;
receiving a message from the cell other than the serving cell;
determining, as part of the determination procedure, a first value of the first parameter based at least in part on the message from the cell other than the serving cell and based at least in part on the exclusion of the first parameter from the configuration information received in the control message;
determining the transmit power for the uplink reference signal based at least in part on the first value of the first parameter; and
transmitting, during the positioning procedure, the uplink reference signal according to the transmit power.

17. The method of claim 16, wherein the first parameter corresponds to a target received power at the cell other than the serving cell.

18. The method of claim 16, wherein:
the first parameter corresponds to a reference path loss associated with a signal degradation between the UE and the cell other than the serving cell.

19. The method of claim 16, wherein transmitting the uplink reference signal according to the transmit power comprises:
transmitting the uplink reference signal to the cell other than the serving cell with the transmit power.

20. The method of claim 16, wherein determining the transmit power comprises:
determining a maximum transmit power associated with the UE; and
setting the transmit power based at least in part on the maximum transmit power.

21. The method of claim 16, wherein the message is received in a master information block from the cell other than the serving cell.

22. The method of claim 16, wherein determining that the uplink reference signal is associated with the positioning procedure further comprises:
receiving an explicit indication that the uplink reference signal is associated with the positioning procedure.

23. An apparatus for wireless communications at a user equipment (UE), comprising:
means for establishing a connection with a serving cell;
means for receiving a control message comprising configuration information for an uplink reference signal associated with a positioning procedure to identify a geographic location of the UE, wherein a first parameter associated with a transmit power for the uplink reference signal is excluded from the configuration information received in the control message, wherein the exclusion of the first parameter comprises the configuration information in the received control message excluding an indication of a downlink reference signal for estimating a path loss between the UE and the serving cell and also excluding an indication of a downlink reference signal for estimating a path loss between the UE and a cell other than the serving cell, and wherein the exclusion of the first parameter from the configuration information is associated with a determination procedure that is associated with a cell other than the serving cell;

means for receiving a message from the cell other than the serving cell;

means for determining, as part of the determination procedure, a first value of the first parameter based at least in part on the message from the cell other than the serving cell and based at least in part on the exclusion of the first parameter from the configuration information received in the control message;

means for determining the transmit power for the uplink reference signal based at least in part on the first value of the first parameter; and mean for transmitting, during the positioning procedure, the uplink reference signal according to the transmit power.

24. A non-transitory computer-readable medium storing code for wireless communications at a user equipment (UE), the code comprising instructions executable by one or more processors to:

establish a connection with a serving cell;

receive a control message comprising configuration information for an uplink reference signal associated with a positioning procedure to identify a geographic location of the UE, wherein a first parameter associated with a transmit power for the uplink reference signal is excluded from the configuration information received in the control message, wherein the exclusion of the first parameter comprises the configuration information in the received control message excluding an indication of a downlink reference signal for estimating a path loss between the UE and the serving cell and also excluding an indication of a downlink reference signal for estimating a path loss between the UE and a cell other than the serving cell, and wherein the exclusion of the first parameter from the configuration information is associated with a determination procedure that is associated with a cell other than the serving cell;

receive a message from the cell other than the serving cell;

determine, as part of the determination procedure, a first value of the first parameter based at least in part on the message from the cell other than the serving cell and based at least in part on the exclusion of the first parameter from the configuration information received in the control message;

determine the transmit power for the uplink reference signal based at least in part on the first value of the first parameter; and transmit, during the positioning procedure, the uplink reference signal according to the transmit power.

* * * * *